US011546423B2

(12) United States Patent
Carpentier et al.

(10) Patent No.: US 11,546,423 B2
(45) Date of Patent: Jan. 3, 2023

(54) CONTENT CENTRIC SHARING OF DIGITAL OBJECTS

(71) Applicant: Esoptra NV, Herentals (BE)

(72) Inventors: Paul Carpentier, Boechout (BE); Jan Van Riel, Geel (BE); Michiel De Backker, Vosselaar (BE)

(73) Assignee: TWINTAG NV, Herentals (BE)

( * ) Notice: Subject to any disclaimer, the term of this patent is extended or adjusted under 35 U.S.C. 154(b) by 41 days.

(21) Appl. No.: 16/837,583

(22) Filed: Apr. 1, 2020

(65) Prior Publication Data

US 2020/0322429 A1     Oct. 8, 2020

Related U.S. Application Data

(60) Provisional application No. 62/827,974, filed on Apr. 2, 2019.

(51) Int. Cl.
| | |
|---|---|
| *H04L 67/1074* | (2022.01) |
| *H04L 9/06* | (2006.01) |
| *H04L 9/40* | (2022.01) |
| *H04L 67/02* | (2022.01) |
| *H04L 67/06* | (2022.01) |

(Continued)

(52) U.S. Cl.
CPC ........ *H04L 67/1085* (2013.01); *H04L 9/0637* (2013.01); *H04L 9/0643* (2013.01); *H04L 63/083* (2013.01); *H04L 67/02* (2013.01); *H04L 67/06* (2013.01); *H04L 67/1097* (2013.01); *H04L 9/50* (2022.05)

(58) Field of Classification Search
None
See application file for complete search history.

(56) References Cited

U.S. PATENT DOCUMENTS 10,244,065 B2 *   3/2019   Sandholm ............... H04W 4/06
10,909,222 B1 *   2/2021   Fregly ................. G06F 16/9566
(Continued)

FOREIGN PATENT DOCUMENTS

WO    WO 00/51034        8/2000

OTHER PUBLICATIONS

International Search Report from International Application No. PCT/IB2020/053113 dated Jun. 9, 2020.

*Primary Examiner* — Lashonda Jacobs-Burton
(74) *Attorney, Agent, or Firm* — Beyer Law Group LLP

(57) ABSTRACT

A unique bag identifier is generated for digital objects to be stored in object storage. A unique download identifier is generated for downloading of these objects and a unique upload identifier is generated for uploading of the objects; all three identifiers are associated in a database. The identifiers are distributed verbally, by electronic mail, by text message, etc. Any holder of these identifiers may access the digital objects without a user account and without installing an application on a computing device other than using a browser. A QR code or alphanumeric code is displayed on a computing device in order to allow another device to access the objects. Objects may be uploaded via electronic mail. Uploading or downloading is protected by an owner-generated password. Digital objects are sealed by calculating their hashes, placing these hashes in a file and calculating a hash for that file. This file hash is submitted to a block chain and a transaction identifier is returned.

10 Claims, 20 Drawing Sheets

(51) Int. Cl.
*H04L 67/1097* (2022.01)
*H04L 9/00* (2022.01)

(56) References Cited

U.S. PATENT DOCUMENTS

| | | |
|---|---|---|
| 2012/0066277 A1 | 3/2012 | Ubukata et al. |
| 2014/0280059 A1* | 9/2014 | Irwin .................. G06F 16/2457 707/722 |
| 2015/0249647 A1 | 9/2015 | Mityagin et al. |
| 2017/0083277 A1* | 3/2017 | Liu ....................... G06F 3/1454 |

* cited by examiner

FIG. 1B

Object Storage

Blockchain Notarization

Blockchain Properties

| | |
|---|---|
| File | sealinfo.html — 840 |
| Hash | *d733f4c32acve45c7b725d7381489* — 844 |
| Time | 2020/02/18-13:44:02 |
| SealID | 4d06fbd3ed92d3530facc66cdc6027c1 — 848 |

Ethereum Internal
852

| | |
|---|---|
| TransactionID | 47a5986ff2a8c917219e473f2654bd2865be1594187... |
| MerkleRoot | d733f4ce2adff043e7b725b607301409 |
| Explore | Verify — 856 |

CONTENT CENTRIC SHARING OF DIGITAL OBJECTS

CROSS-REFERENCE TO RELATED APPLICATIONS

This application claims priority of U.S. provisional patent application No. 62/827,974, filed Apr. 2, 2019, entitled "ZERO APPLICATION ZERO ACCOUNT," which is hereby incorporated by reference.

FIELD OF THE INVENTION

The present invention relates generally to the storing and sharing of information over a computer network. More specifically, the present invention relates to uploading and downloading content without having an account or using an application on a user device.

BACKGROUND OF THE INVENTION

There are many mechanisms, technologies, products and services for content storing and sharing. All of these need to serve a very wide variety of use cases, in B2B, B2C and P2P scenarios. Mostly for historical reasons harking back to mainframe times, most storing and sharing functions are organized around the notion of an "account," generally defined as an aggregated content structure associated with a given person, organization or role, and which are especially important in matters of access permissions and security.

But, accounts require complexity, and implicate two important requirements—custom applications and credentials. For one, the requirement of downloading an application other than a browser (e.g., onto a mobile device) gets in the way of instant gratification and makes people think twice before proceeding with establishing an account. People need to be fairly motivated to add yet another resource-consuming item to their overtaxed mobile device, tablet or computer. Second, the lack of uniform standards for credentials management creates a substantial hurdle whenever a new account needs to be made, a password selected and remembered somehow. Over time, many users become allergic to accounts and passwords altogether and are that much more hesitant to open an account in order to store and share information.

Most all workers today need to deal with an ever-expanding universe of electronic devices and computing environments between which they need to share or transfer information, either within a personal context or when sharing with coworkers or third parties. File servers and USB sticks are quickly losing significance in this shifting landscape. DropBox (and similar technologies) fill some gaps but add new complexity and productivity hurdles, most related to security and ownership (e.g., requiring user accounts). Low-friction, content-centric sharing scenarios remain elusive.

Accordingly, techniques and systems are desired that will allow simple and easy sharing of digital content.

SUMMARY OF THE INVENTION

To achieve the foregoing, and in accordance with the purpose of the present invention, a system is disclosed that provides easy-to-use content sharing.

We believe that a large number of information storing and sharing uses cases are underserved because they are content-centric rather than person or group related. It is believed that there are a large number of content sharing use cases that are a much closer fit for a model without accounts, i.e., a technology that can store and share content without any requirement that a user establish an account or use a downloaded application. This technology is based upon "paper bags" of digital content that need not be associated with any given individual or group. Access considerations can be laser-focused on that specific content, thereby avoiding traditional overhead.

Unlike traditional personal cloud storage offerings from DropBox, OneDrive, Google Drive and others, the present invention does not build its content space around an account for a given user who provides a user name, password, etc. While this prior approach has proven useful and popular, we believe there are many situations where it may be counter-productive to the use case.

Using nothing more than a browser and an internet connection, going to a system Web site (such as "zaza.rocks") opens up a fresh "paper bag" featuring unique identifiers for uploading, downloading and sharing content. Those unique URLs can be shared inside any message or document, using QR codes and cameras, or even using short-lived short URLs. Pages of QR codes can be pre-printed and subsequently used to attach digital content to a physical object, e.g., a user manual to an espresso machine.

Such a technology allows for a truly content-centric and "low friction" approach. When compartmentalizing content clusters rather than aggregating them under a single user account, the process can be made intrinsically more safe as there are no accounts to be hacked, and access to one "content bag" will not provide any clue for accessing another bag of content. Low friction is indeed an important consideration in many sharing use cases, especially in B2C and P2P.

Variants on the below use cases are plentiful, as the once ubiquitous USB sticks are becoming less popular for content sharing because of security concerns and because of decreasing presence of USB ports on computing devices; the invention described below will provide the flexibility required. For example, a simple URL can be embedded into any digital document or application, while a QR code can be attached to any physical object or carrier. When respectively clicked or scanned, the result is that access to a bag of content items is allowed without needing to download an application or register a user account.

While use cases implemented with traditional account-centric sharing will invariably carry the overhead of traditional security, such as installing applications, user names and passwords—even for non-sensitive materials such as the user manual of a coffee maker—no such burdens exist for the present invention. In other words, with the present invention, pressing a download icon, tapping on a download URL, scanning a QR code, typing a URL with a code into a browser, etc., all can open a PDF file (for example) within a few seconds.

Regarding the uploading of documents to share; the potential for use cases is endless: collecting pictures from twenty people after a party, collecting feedback forms after a presentation, collecting photos or videos from QR code stickers on sign posts as a response to a long-term enquiry by a city about the state of its biking infrastructure, etc. Sending 100 MB of files in an e-mail message is a challenge already. Requesting 100 MB of files from someone who is not very technical even more so. Sending an upload link utilizing the present invention by any kind of medium is conceptually similar to sending a self-addressed stamped envelope using regular mail; the end user will find it refreshingly simple to upload documents.

The present invention also provides the following advantages: the ability to add to or curate the shared content collection over time, using the same upload link or the same owner link; the ability for multiple parties to contribute to a shared content bag of digital objects, possibly many in parallel; selectively share the upload, download or owner URLs which each provide different control rights to the content bag; and using separate, independent links or QR codes to do so; conveniently share content bags (i.e., the upload, download or owner URLs between mobile devices for upload or download in seconds with a single QR code scan; share bags between any devices by dictating a short code; and print a page of QR code labels (representing a bag of digital contents), then stick them on documents or object, ready to be scanned using any mobile device.

BRIEF DESCRIPTION OF THE DRAWINGS

The invention, together with further advantages thereof, may best be understood by reference to the following description taken in conjunction with the accompanying drawings in which:

FIG. 1B shows two tables used to implement a database structure used for management of the digital objects within object storage.

FIG. 16 illustrates a block chain notarization page that may be produced after step 816.

FIG. 17 is a page from "Etherscan" which is a publicly available service.

DETAILED DESCRIPTION OF THE INVENTION

Given the capabilities of today's browsers and responsive Web technologies, all functionality required for straightforward content sharing is easily built in a single Web page, or three pages in one particular implementation. Since we want to reduce friction to a minimum, we simply invite a user—new or returning—to open any browser on any device and navigate to the system Web site (in our example, "zaza.rocks" which will redirect to "https://zaza.rocks" for content security). At that point, a "fresh new paper bag" will be created and ready for use, as a random 32-hexadecimal digit (128 bits) identifier in a URL will have been generated, e.g., "https://zaza.rocks/a6f44fb790ae94f25ca2b61f5f1b04f4." We call this the owner page (illustrated below), as it concentrates access to all sharing options.

On the owner page, there are several ways to add content items to the bag, as well as view, retrieve and delete the contents. In addition, one design element is the splitting of those functions over two separate pages ("upload" and "download" pages) that are disconnected from each other and can be separately shared, to provide other people with the capability to either upload to the bag (without seeing what's inside) or to view and to download content from the bag (without being able to modify the latter). These three pages have unique and independent identifiers (and URLs). Possession of the upload or download identifier (or URL) does not provide access to the other one by a user. Although the owner page does provide access to the upload and download pages.

Important is the minimal friction when sharing the pages using either standard platform capabilities such as copy and paste of the pertaining page's URL into e-mail messages, SMS messages, WhatsApp messages, Twitter messages, FaceBook posts, Word documents, Excel spreadsheets, corporate applications (such as SAP, Salesforce), etc., or transmitting through other mechanisms like Apple's Airdrop. Wherever a clickable link (of the download page for example) can be embedded, content can be attached and downloaded. Upon clicking the link, if a bag contains multiple elements, the download page will be opened. Or, to upload, upon clicking the link, the upload page is opened and content may be uploaded to the bag.

Figure 1A:
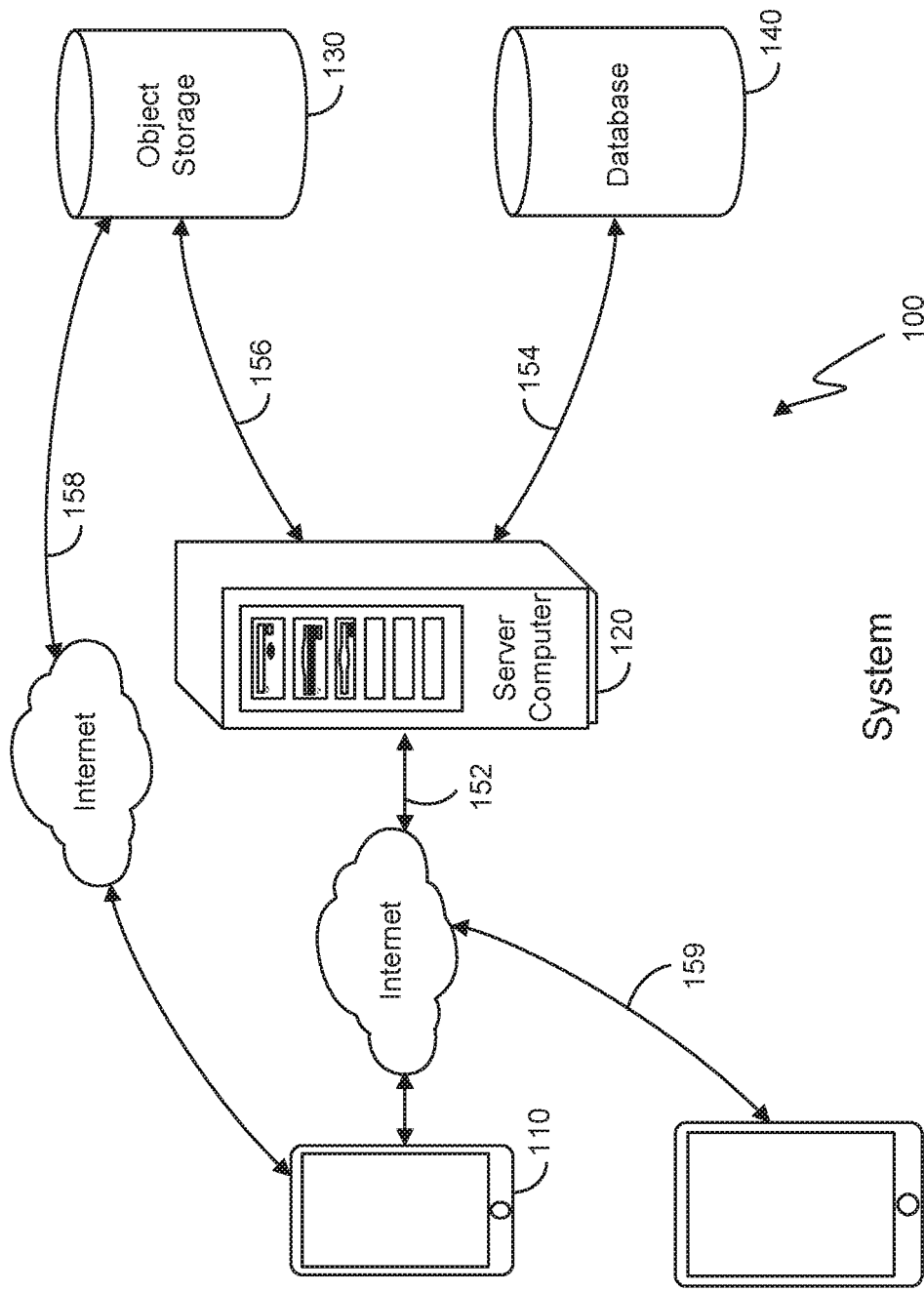
FIG. 1A is a system diagram upon which an embodiment of the invention may be implemented.

FIG. 1A is a system diagram 100 upon which an embodiment of the invention may be implemented. Shown is a user computing device 110, which in this case is a mobile telephone (shown in the examples below), although any computing device such as a tablet computer, laptop computer, desktop computer, etc., may be used with the present invention. As described below, the user computing device need not download nor implement any special application software (other than a standard Internet browser) in order to make use of the present invention. Also shown is a server computer 120 accessible by the user computing device over an Internet connection which hosts a Web site of the present invention (in this example, "zaza.rocks") and associated software as will be explained in greater detail below. In one particular embodiment, the software that implements the Web site and functionality of the below embodiments is a plug-in function running on an Esoptra server as is described in U.S. patent application publication number 2018/0322136.

Object storage 130 is any suitable storage location for storing digital objects (such as digital files, photographs, videos, documents, medical records, etc.). In one particular embodiment, digital objects are stored using a unique identifier for each object, by which the object may be stored and retrieved. In particular, the Amazon S3 object storage works well, although other object storage platforms such as Caringo CAStor or Swarm may also be used. As such, object storage 130 is typically remote or separate from server computer number 120, although they may be part of the same computer. The content that a user wishes to upload, store and share from his or her computing device will be stored in this object storage. Database 140 is a database of metadata used to manage access to object storage 130 and may be implemented using any SQL database; Aurora from Amazon works well. Access to database 140 is provided on server computer 120.

During operation of the invention, the user device 110 communicates over an https connection 152 with the server computer. An https connection 158 may also be set up directly between device 110 and object storage 130 that bypasses server computer 120. Server computer 120 communicates over a secure connection 156 with object storage 130 and communicates over a secure connection 154 with database 140.

Figure 1B:
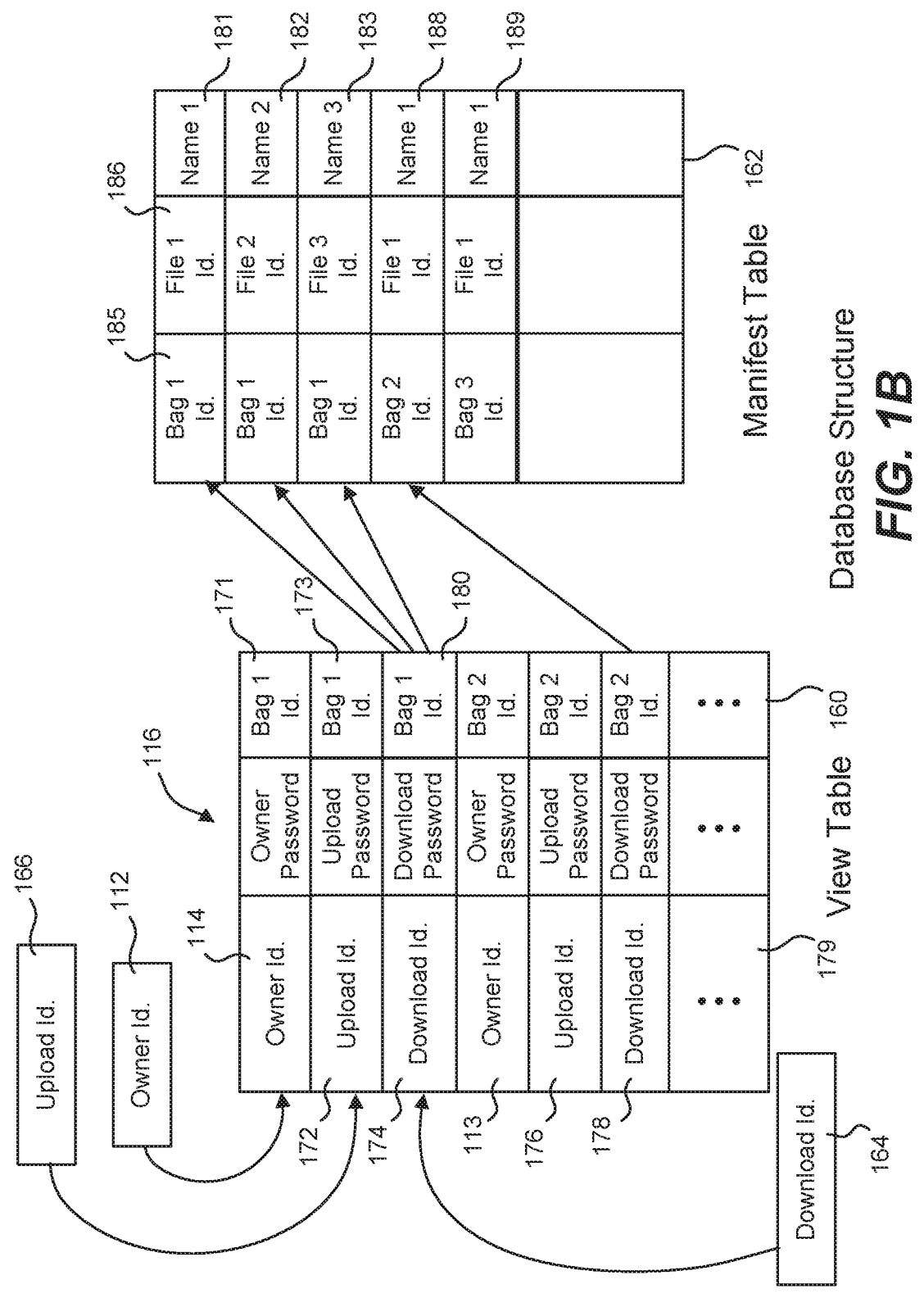

FIG. 1B shows two tables used to implement a database structure within database 140 used for management of the digital objects within object storage 130. As shown, view table 160 includes a first column holding owner, upload or download identifiers, each associated with a corresponding bag identifier in the third column. A first user (owner) would be in possession of identifiers 112, 172 and 174, while a second user (owner) would be in possession of identifiers 113, 176 and 178. Table 160, thus, holds triplets of identifiers for all user owners, although these triplets need not necessarily be in a single table. As shown, the first three identifiers correspond to the first content bag while the second three correspond to a second content bag independent of the first, and so on.

Manifest table 162 is preferably a single table that includes a row for each digital object that is stored within object storage 130 for all user owners. As shown, rows 181-183 correspond to digital objects in a first bag owned by first owner, while row 188 corresponds to a single digital object in a second bag owned by second owner, and row 189 corresponds to a single digital object in the third bag owned by third owner. For example, row 181 identifies a digital object by its bag identifier 185, a unique file identifier 186 and a human-readable name 187.

As will be described in greater detail below, when an upload identifier 166 from a user device (along with a digital object to upload) is presented to the plug-in function on server computer 120, it references the same upload identifier 172 in table 160. The corresponding bag identifier 173 may then be used to store the digital object at an appropriate location within object storage 130. In a similar fashion, the second owner (or other user) holding upload identifier 176 may use that upload identifier to upload digital objects into another content bag utilizing the bag 2 identifier.

In a similar fashion, the first owner (or other user) in possession of download identifier 164 presents that identifier from his or her user device to the plug-in function which then references download identifier 174 in table 160. The corresponding bag 1 identifier 180 may then be used as an index into table 162 to identify all of those rows (181-183, in this example) identifying all digital objects within bag one. In one embodiment, a digital object is downloaded from object storage 130 using its bag identifier 185 and its file identifier 186.

Thus, triplets of owner, upload and download identifiers are associated with only a single bag identifier which holds all digital objects in the unique logical, so-called "content bag" separate from all other logical content bags. In one embodiment, the bag identifier is the same as the owner identifier, but this is not a requirement; they may be different identifiers.

In other words, for every content bag which includes a collection of digital objects (such as the three files associated with the bag 1 identifier shown in table 162) there will be only one unique bag identifier, only one unique upload identifier and only one unique download identifier. Conversely, each triplet only identifies a single content bag, that is to say, the bag identifier, upload identifier and download identifier each only identify a single content bag which is a collection of one or more digital objects in object storage. Similarly, it can be seen from table 160 that there is a one-to-one relationship between the bag identifier, upload identifier and download identifier in any triplet; in other words, the upload identifier is uniquely associated with only a single bag identifier, the download identifier is uniquely associated with that same single bag identifier, and, the bag identifier of the triplet is only associated with a single upload identifier, a single download identifier and a single owner identifier. As mentioned above, the bag and owner identifier may or may not be identical.

Figure 1C:
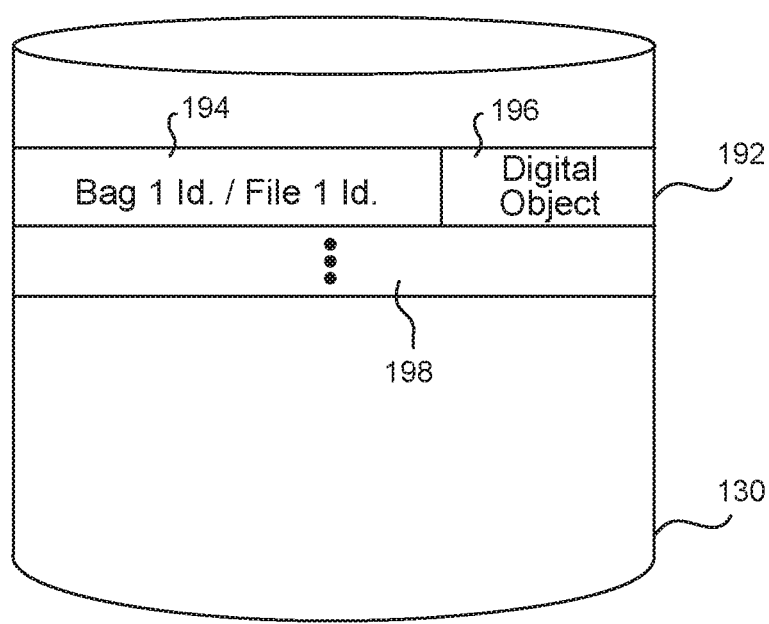
FIG. 1C illustrates a preferred embodiment for the structure of object storage.

FIG. 1C illustrates a preferred embodiment for the structure of object storage 130. As shown, each digital object 196 in the object storage is stored using as its reference a concatenation of its bag identifier and its file identifier 194. Or, any other suitable combination of the bag identifier and its file identifier may be used. Thus, digital objects are stored during an upload command by concatenating the two identifiers and storing the results in an index in object storage 130, and then updating a corresponding row in table 162. Similarly, a digital object may be downloaded from object storage 130 by using as a reference a concatenation of its bag identifier and its file identifier.

In one embodiment, connection 152 may be used between the user device and the server computer in order to implement either the upload or download functions. Alternatively, downloading may be accomplished via the authenticated connection 158 directly between the user device and object storage 130 as long as the user device is already in possession of both the bag identifier and the file identifier for a particular digital object (typically these identifiers are passed to the user device when the download page is presented to the user device listing the names of content within that bag).

Creation of Owner Page

Figure 2:
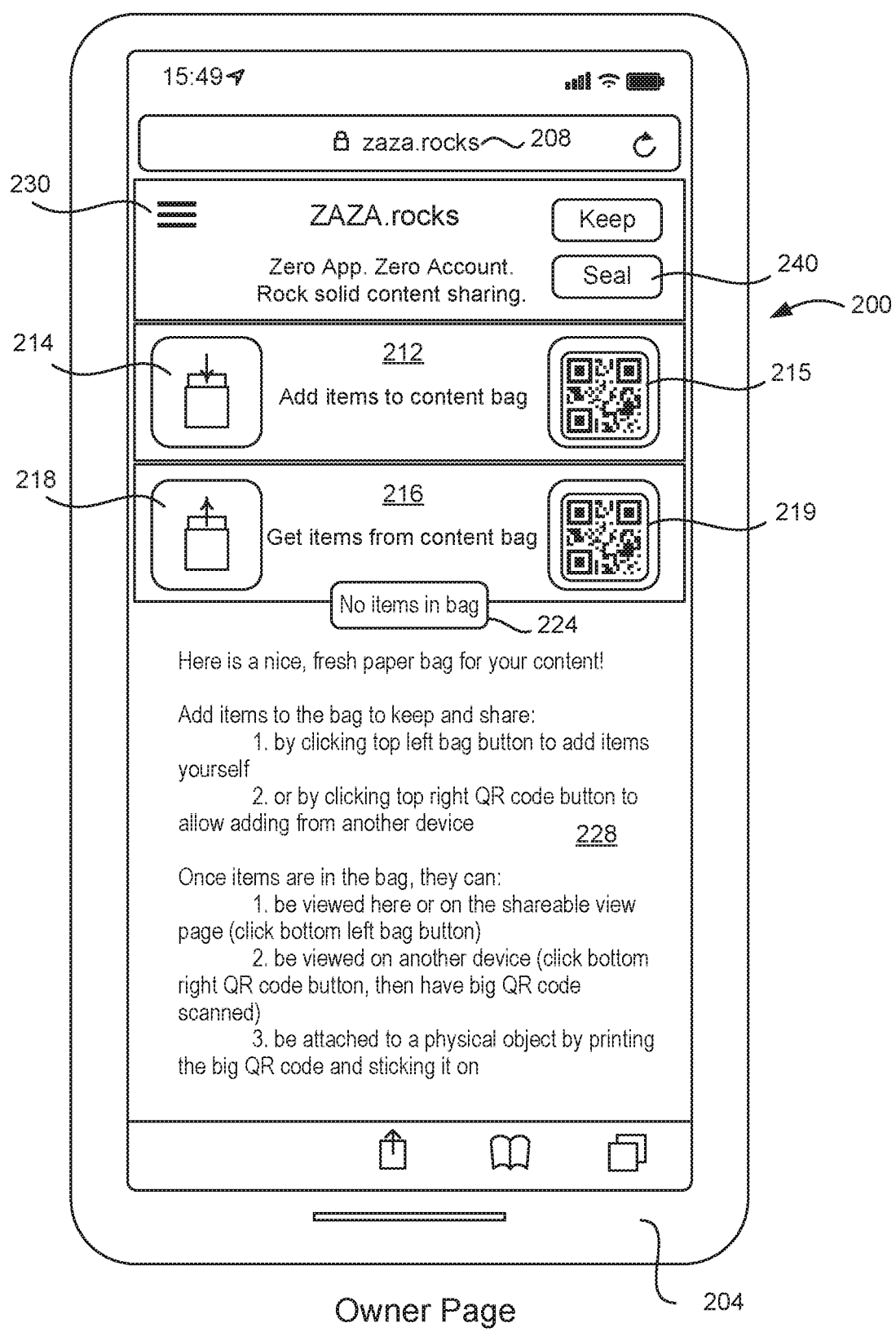
FIG. 2 illustrates an owner Web page created as part of the system Web site as will be explained in greater detail below.

FIG. 2 illustrates an owner Web page 200 created as part of the system Web site as will be explained in greater detail below. Shown is a screen 204 of a user's mobile telephone (the telephone itself is not shown) which displays the owner Web page within a browser of the mobile telephone. The Web page includes the name of the Web site 208, a region 212 by which a user may add content to a bag and the region 216 by which a user may download content from that same bag. Icon 214 allows a user to upload digital objects to the bag when pressed and a corresponding QR code icon 215 permits the same upload functionality as will be explained in greater detail below. Icon 218 allows a user to download digital objects from the bag when pressed and a corresponding QR code icon 219 permits the same download functionality as will be explained in greater detail below. Region 228 includes further description and instructions for this upload and download functionality.

Figure 3:
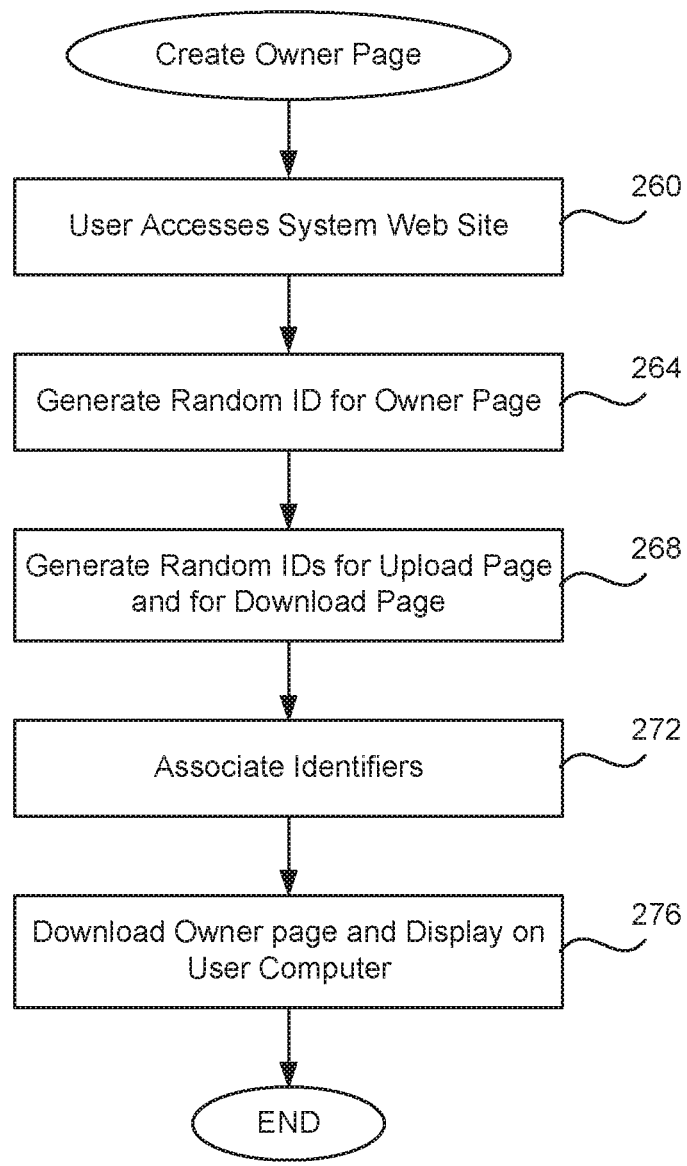
FIG. 3 is a flow diagram describing one embodiment by which the system creates an owner Web page.

FIG. 3 is a flow diagram describing one embodiment by which the system creates an owner Web page. In a first step 260 a user uses a suitable browser of a computing device (such as a mobile telephone, laptop computer, etc.) to navigate to the system Web site (in this example, "zaza.rocks") for the first time. Typically, this request will redirect the user's browser to an "https" address for greater security. Note that the user does not need to download, install or execute any special software application (i.e., an "app") on his or her device (other than using an Internet browser which is standard on most all computing devices), and, the user does not need to establish an account (e.g., provide a user name, password and other personal information) in order to create an owner page.

Merely by accessing the system Web site, the following steps will then occur. In step 264 the system then generates a unique identifier for the owner page which also serves as a unique identifier for the user's "content bag," that is, the logical location to which the user's content will be uploaded and from which that content will be downloaded. A unique identifier for the owner page (and for the upload page and download page described below) may be generated in different ways, may take different forms and have different lengths. In fact, unique identifiers may be generated for the owner page, download page and upload page in different ways. In one specific embodiment, all of these use unique identifiers are generated in the same way by generating a random string of 32 hexadecimal characters (128 bits). Such a random string may be generated by a standard cryptographically-secure random number generator function using a preferred embodiment such as "crypto/rand.Read" in the GO open source programming language standard library.

For example, the URL for the owner page may be "https://zaza.rocks/a6f44fb790ae94f25ca2b61f5f1b04f4" which includes the random string of 32 hexadecimal characters. Other techniques for generating unique identifiers for these pages include One-way hash functions, Microsoft Globally Unique Identifiers or any other way of generating uniformly-distributed random numbers.

In a next step 268, unique identifiers are generated in the same way for the upload page and the download page, i.e., there will be a random string of 32 hexadecimal characters for the upload page and another random string for the download page, and each of these strings will be used to create a unique URL for each of these pages. In a next step 272 these three unique identifiers are associated together in order to facilitate the uploading and downloading of content by the original user or by other users. For example, FIG. 2 illustrates the owner page 200 which has the URL as listed above. Within this page is icon 214 which represents the ability to upload content to the owner's bag, and thus the upload URL is embedded within page 200. As will be explained in greater detail below, clicking upon icon 215 produces a larger QR code representing the upload page URL which is also embedded within page 200. In addition, icon 218 represents the ability to download content from the owner's bag, and thus the download URL is embedded within page 200. As will be explained in greater detail below, clicking upon icon 219 produces a larger QR code representing the download page URL which is also embedded within page 200. Thus, these three unique identifiers are associated together by virtue of the upload and download identifiers being embedded within owner page 200.

It is also possible that buttons 214 and 218 do not embed upload or download URLs, but simply transmit an instruction to server computer 120 to present the upload or download page of user device (using table 160). In this case, the client device downloads the page from the server; the client device does not present the upload or download URL to the server computer.

Furthermore, these three identifiers may also be associated together in a database structure. For example, the database structure shown in FIG. 1B (or in any similar database structure) may be used to associate these three identifiers together in order to manage the uploading and downloading of content to and from a particular owner's bag of content. In this example, in step 272, these identifiers may be placed in association in view table 160 as shown. Thus, once the three identifiers have been generated in steps 264 and 268, the owner, upload and download identifiers are placed at locations 114, 172 and 174, respectively, and the owner page identifier (also termed the bag 1 identifier in this example) is placed at locations 171, 173 and 180. Thus, a user in possession of upload identifier 166 or in possession of download identifier 164 will have these identifiers mapped to the bag 1 identifier by virtue of table 160. Of course, other types of tables, structures or databases may also be used to associate these three identifiers together. As discussed above, manifest table 162 includes a row for each digital object that has been uploaded to a particular content bag. As no content has been uploaded to this bag, manifest table 162 may be empty at this point in time. Nevertheless, it may be desirable to pre-populate the first column of table 162 with one or more instances of the bag 1 identifier.

Next, in step 276 the owner page produced by the system within server computer 120 may be downloaded to the user computing device and displayed such as is shown in FIG. 2. At this point, the owner of the created content bag may upload digital objects to that bag by pressing icon 214, may allow others to upload digital objects by pressing icon 215, may download digital objects from that bag by pressing icon 218, or may allow others to download digital objects by pressing icon 219. Thus, merely by possessing the owner page (or by having that unique URL) or by possessing the unique upload URL, one may upload digital objects to the content bag uniquely identified in object storage by the owner URL. And, by merely possessing the download page (or by having that unique URL), one may download digital objects from the content bag uniquely identified in object storage by the owner URL. There is no requirement that a user download an application, and no requirement that a user create an account, identify himself or herself in any way, such as by providing personal information, an e-mail address, password, etc.

Upload Content to Owner's Bag

Figure 4:
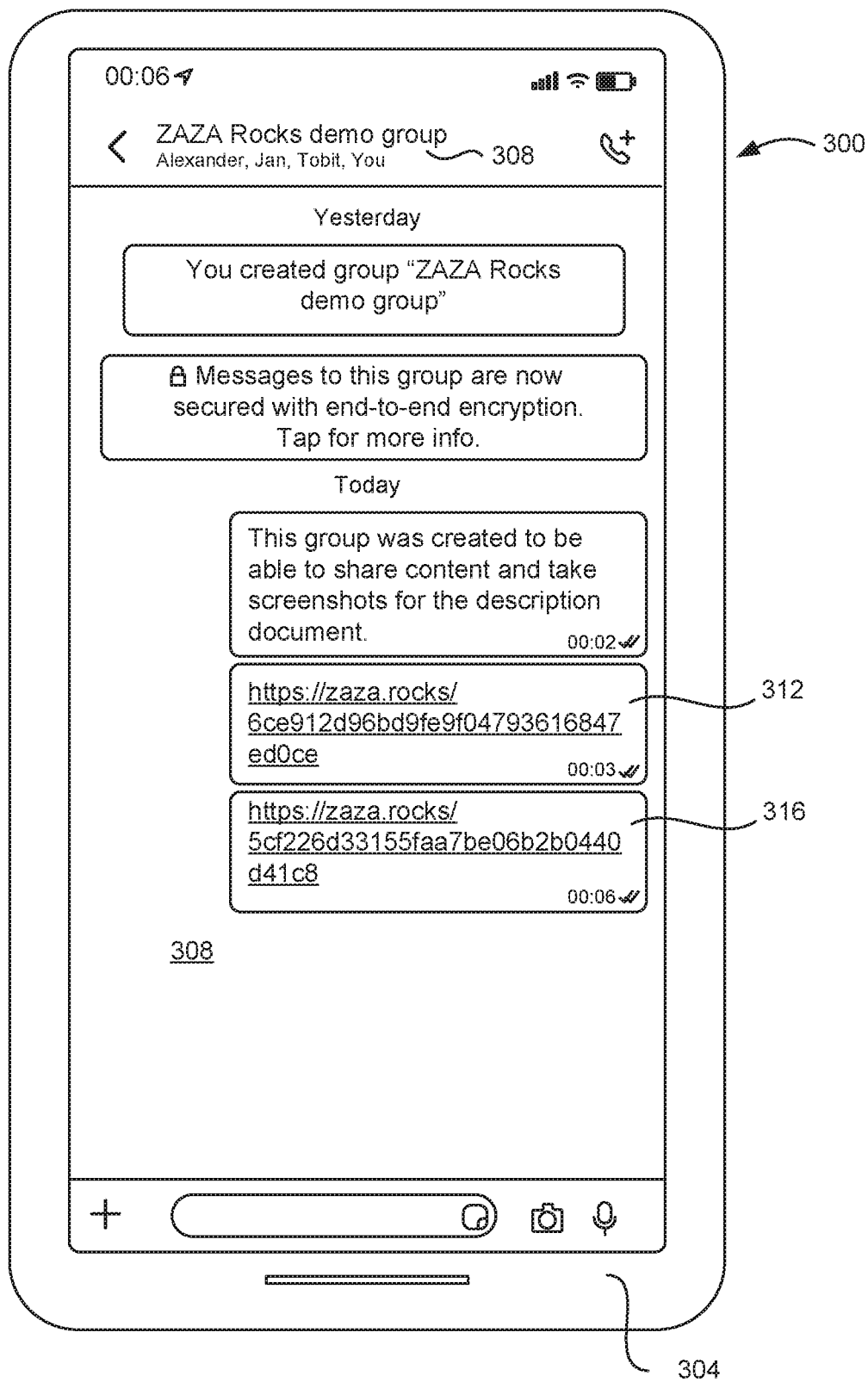
FIG. 4 illustrates a group message in a "What's App" application on a user device, which may be the telephone of the owner or of any of the other users.

FIG. 4 illustrates a group message 300 in a "WhatsApp" application on a user device, which may be the telephone of the owner or of any of the other users. Shown is a screen 304 of the telephone, a header 308 of the WhatsApp group, region 308 displaying messages exchanged between the group members, an upload URL 312 for the upload page described above, and a download URL 316 for the download page described above. It is also possible that URL 312 or 316 may be a URL of the owner page which may also be used to upload and download content. Note that this application is not necessary for use of the invention, however, as will be described in greater detail below, members of the group are simply using the application for convenience in distributing the upload and download URLs.

Figure 5:
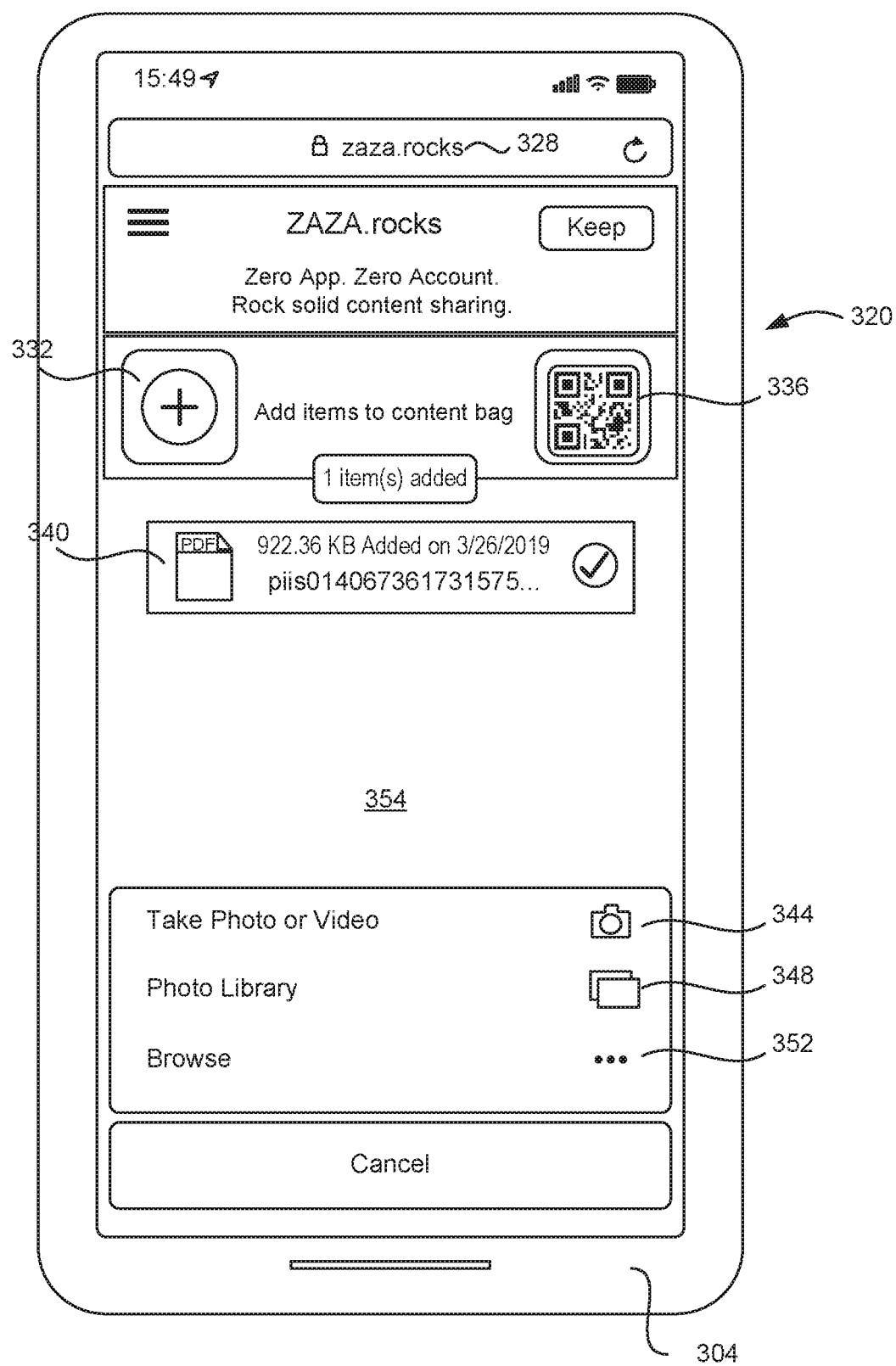
FIG. 5 illustrates the upload page on the user mobile telephone.

FIG. 5 illustrates the upload page 320 on the user mobile telephone. Shown is screen 304, the system Web site 328, an icon 332 for uploading digital objects from that telephone, an icon 336 used for uploading digital objects from other user devices using a QR code which will be described in greater detail below, a digital object 340 which has already been uploaded, and other options 344-352 for uploading other digital objects.

Figure 6:
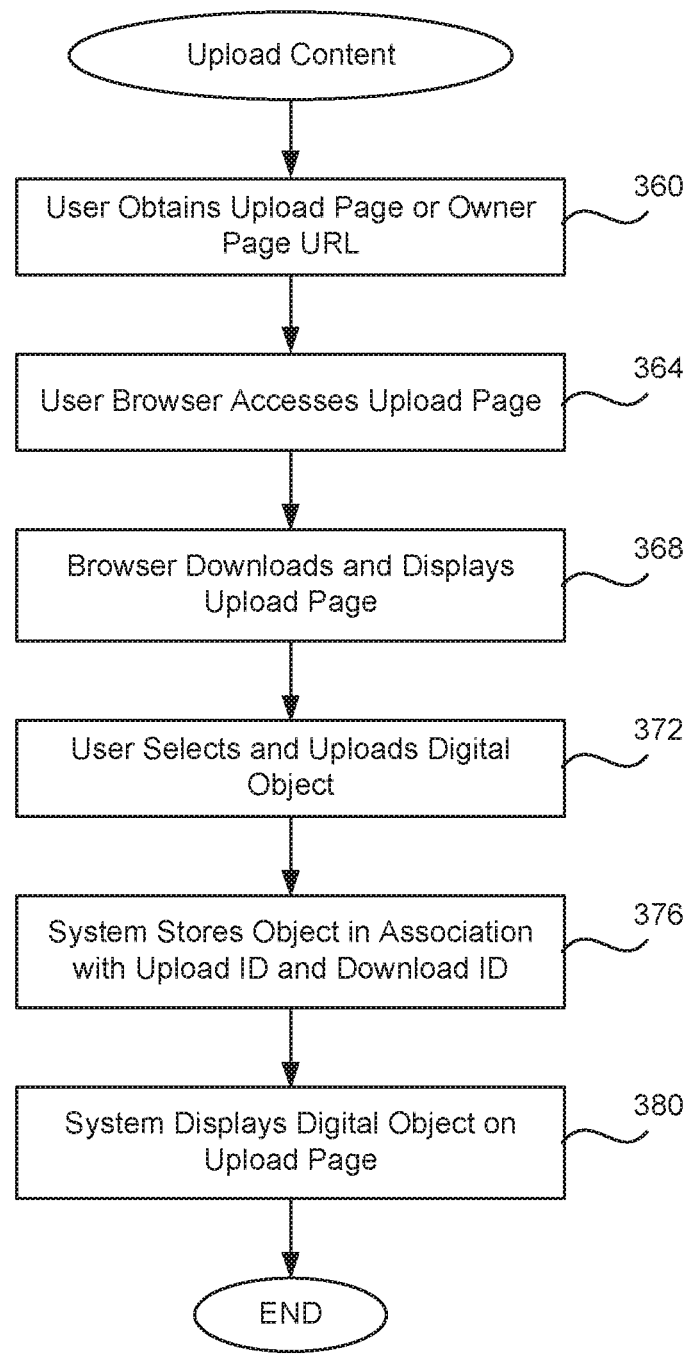
FIG. 6 is a flow diagram describing one embodiment by which any user uploads content to the content bag created by the owner.

FIG. 6 is a flow diagram describing one embodiment by which any user uploads content to the content bag created by the owner. Advantageously, any user with a computing device may upload digital objects to an owner's content bag having only a standard browser on their computing device and either the upload page URL or the owner page URL.

In a first step 360 any user with a computing device obtains the URL for the upload page or for the owner page as uploading may occur using either page. The below description and FIG. 5 assume that the user is using the upload page URL; a description of use of the owner page URL follows later. The upload page URL may be obtained in different manners, for example, FIG. 2 shows how the upload page URL is accessed from the owner page 200 by clicking icon 214. FIG. 4 shows how the upload and download URLs (312 and 316) may be distributed using any suitable messaging service, e-mail, social media posting, etc. Or, the upload page URL may be obtained by clicking icon 215 or by using a six-digit code (both explained in greater detail below).

Figure 9:
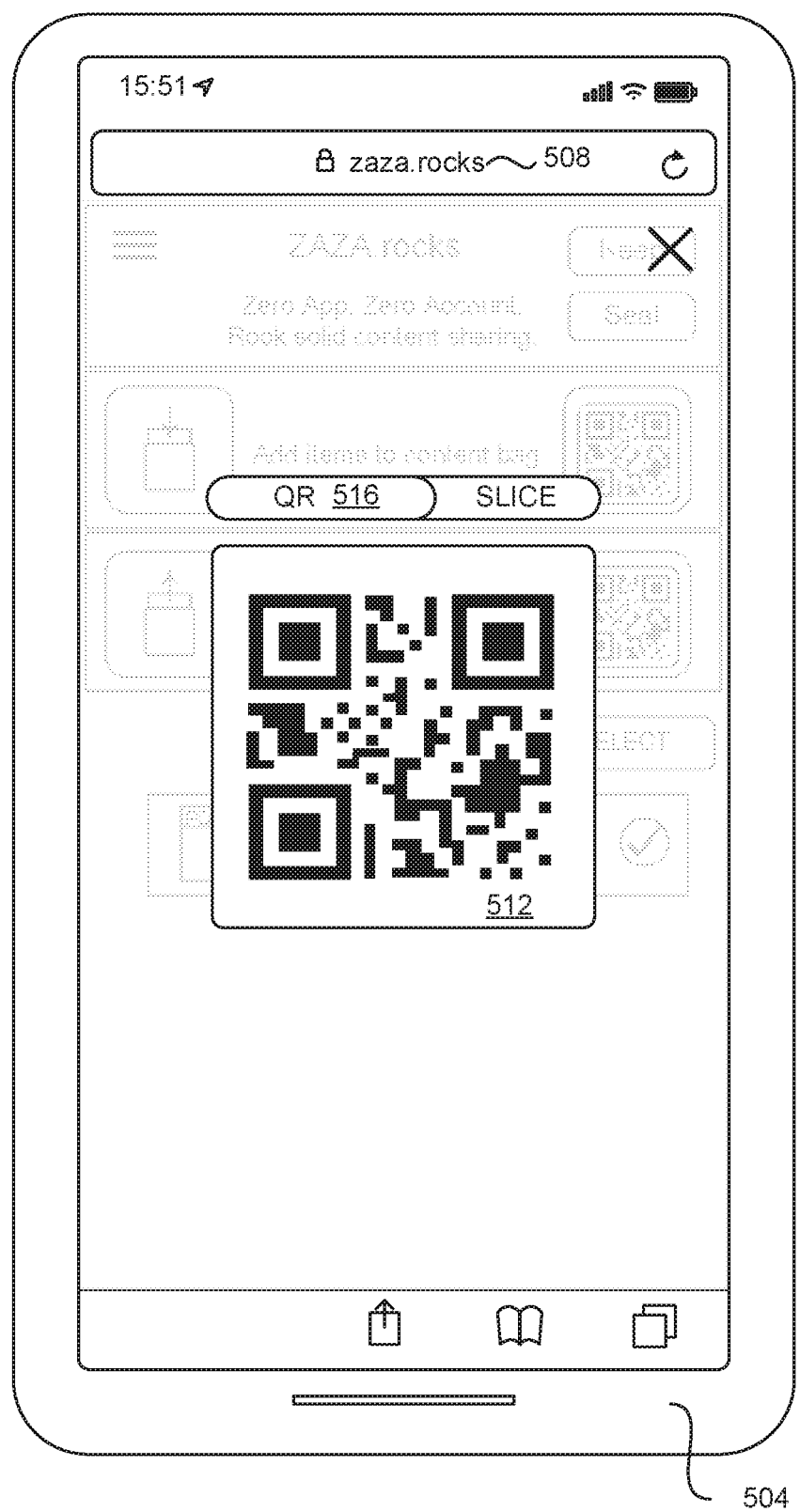
FIG. 9 shows a screen of a first computing device having a touchscreen toggle switch and a QR code.
Figure 12:
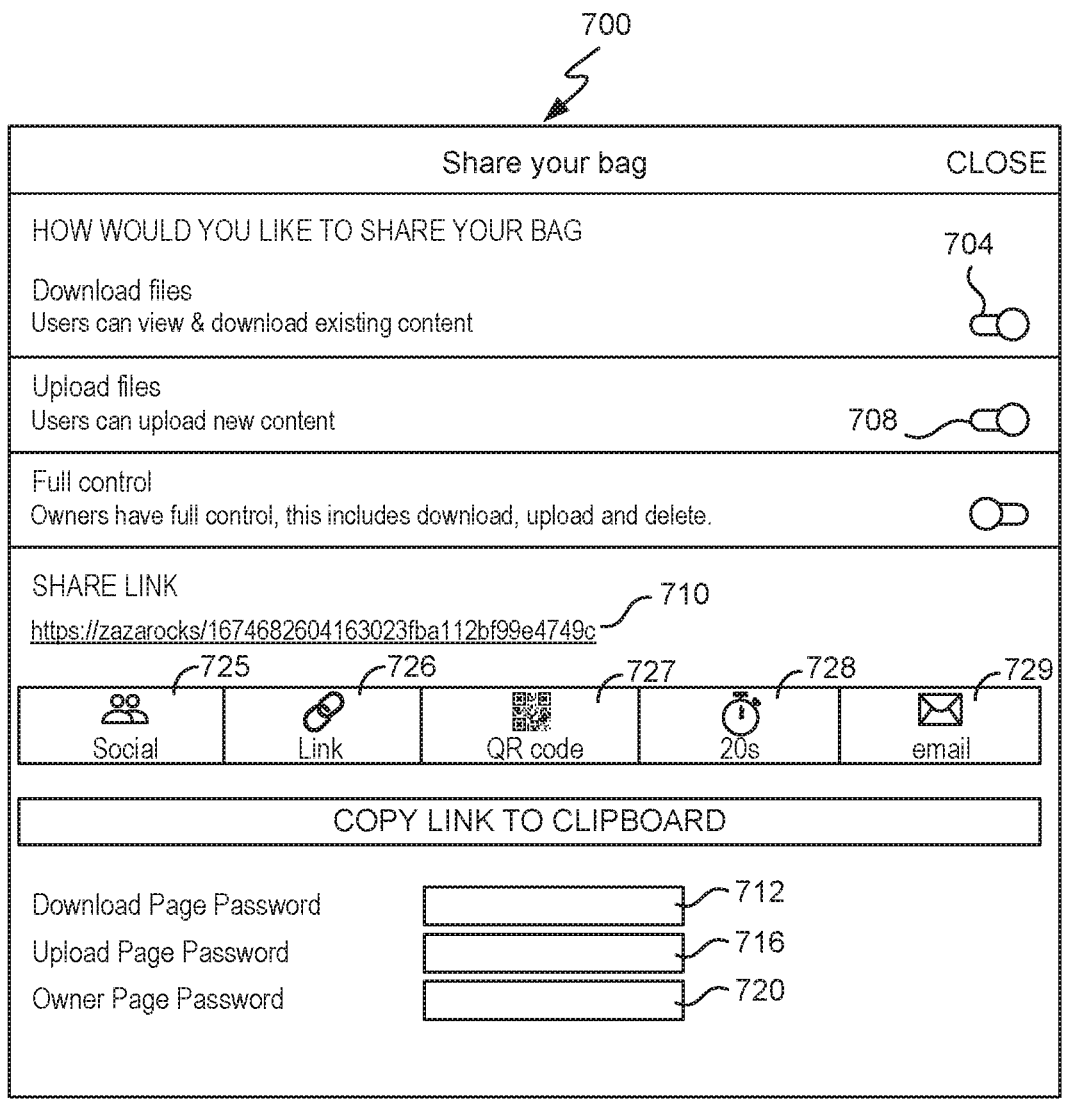
FIG. 12 illustrates a settings screen accessible from the owner page.

FIG. 12 also shows other manners to distribute or to obtain any of the URLs. Link 710 may be copied, cut or pasted into any location. "Social" button 725 provides links to social media sites; "Link" button 726 provides access to button "COPY LINK TO CLIPBOARD" 726b; QR code button 727 displays a QR code such as shown in FIG. 9 that links to the owner page; button "20 s" provides a SLICE code (as described below) for 20 seconds (for example); and e-mail button 729 provides an e-mail message into which the owner identifier, owner page URL or other URL is included. When button 704 is toggled, link 710 will be changed accordingly to show the URL of the download page. When button 708 is toggled, link 710 will be changed accordingly to show the URL of the upload page.

In a next step 364 the user opens a standard Internet browser on his or her computing device, provides the upload page URL or the owner page URL, and accesses that page using the browser. If the user is clicking a link 312 or an icon 214 it is possible that the browser will open automatically and load that page. Or, the user may cut and paste link 312 into a browser in order to access the page. Or, use of a QR code or six-digit code (as explained below) will allow a browser to access the upload page. In the example of FIGS. 4 and 5, when the user selects link 312 the standard browser on his or her mobile telephone will automatically open and will load the page as shown in FIG. 5.

Next, in step 368 the browser downloads and displays the upload page 320 as shown in FIG. 5. As shown in this example, the user has already loaded one digital object shown at 340. Shown is an icon indicating that this digital object is a PDF file, its size, date added, and its 32 hexadecimal character identifier. When adding digital objects via the upload page, the user will not see all of the other objects that had been previously added to the content bag, but will only see those digital objects that they are currently adding. In step 372 the user is then able to select and upload other digital objects from their computing device. Generally, the user may use any mechanism that the operating system of their computing device allows in order to browse, find files, select files, capture information, etc., in order to upload digital objects. For example, using icon 344 the user may take a photograph or create a video using their telephone, and then select this photograph or video to be uploaded. Or, using icon 348 the user may browse the library of photographs on his or her telephone in order to select one to be uploaded. Or, the user may select icon 352 in order to browse the file system of his or her device in order to select a file to be uploaded. Or, in some embodiments, the user may drag any digital object shown on the screen of their device onto region 354 of the upload page in order to upload that digital object. Once the digital object has been selected, dragged or otherwise indicated to be uploaded it appears in region 354 similar to how file 340 appears.

As shown at 340, once an item has been (or is being) uploaded, it receives a checkmark. While the upload page is still shown, the user may delete a digital object or prevent it from being uploaded by selecting the checkmark which then disappears. At that point, the digital object will not be uploaded, or if it has been uploaded, the process will be reversed and the digital object will be removed from object storage. Once the upload page is closed, or once the upload page is refreshed, then all digital objects having checkmarks shown in region 354 will no longer be visible in the upload page.

In step 376 the system then stores the digital objects that have been selected in step 372 into object storage 130. In one particular embodiment, the system architecture shown in FIGS. 1A-1C are used. For example, the upload identifier 166 from the upload page 320 is used as an index into table 160 in order to identify the owner's bag identifier 173. This bag identifier is used then to populate the first column of a row in manifest table 162, such as the first row 181. A file identifier 186 (or reference) is then generated for the digital object to be stored. This reference may be generated in many ways; it is preferably a unique identifier for that digital object. In one particular embodiment, a random unique identifier for the digital object is generated in the same manner that random identifiers are generated for the upload and download pages. This reference is then placed into field 186 and the human-readable name for the digital object (such as that name given to the digital object from the user's computing device is placed into field 181. Next, the digital object is then stored into object storage 130 in association with a concatenation of its bag identifier and its file identifier, such as shown in row 192. Because the download identifier is also associated with the same bag identifier as is the upload identifier in table 160, it will be straightforward to view the contents of the owner's bag (showing the names of digital objects) or to download any digital objects that are in that bag, as will be described in greater detail below.

Finally, in step 380, the system updates the upload page 320 and displays the digital object that has been uploaded to the owner's bag. In this example, PDF file 340 has been selected and uploaded and now appears in region 354 with a checkmark, indicating that it has been uploaded. Shown is the rather obscure file name of the uploaded file as it was known on the user's mobile device and stored in database field 181.

As mentioned above, uploading may also happen via the owner page 200, rather than from the upload page 320. For example, the user in possession of the owner page 200 on his or her computing device may simply select icon 214 in order to upload content. While this selection also makes use of the upload page URL and will present a page similar to page 320, the difference is that all of the digital objects that are currently in the owner's bag will appear on the upload page. Using FIG. 5 as an example, if object 340 had been added to the content bag at an earlier point in time and then any user selects the upload page URL in order to add more content, then object 340 would not appear on the upload page. By contrast, if the owner (or other user) selects icon 214 from the owner page at a later point in time, then object 340 will appear on the upload page because it is already present in the content bag and because access is via the owner page. The system is aware that access is occurring via icon 214 from the owner page because, when selected, the owner page 200 sends the selection (optionally with the upload page URL) to the system Web site.

Download Content from Owner's Bag

As mentioned before, FIG. 4 illustrates a group message 300 in a "WhatsApp" application. Shown is a screen 304 of the telephone, a header 308 of the WhatsApp group, region 308 displaying messages exchanged between the group members, an upload URL 312 for the upload page described above, and a download URL 316 for the download page described above. Note that this application is not necessary for use of the invention, however, as will be described in greater detail below, members of the group are simply using the application for convenience in distributing the upload and download URLs.

Figure 7:
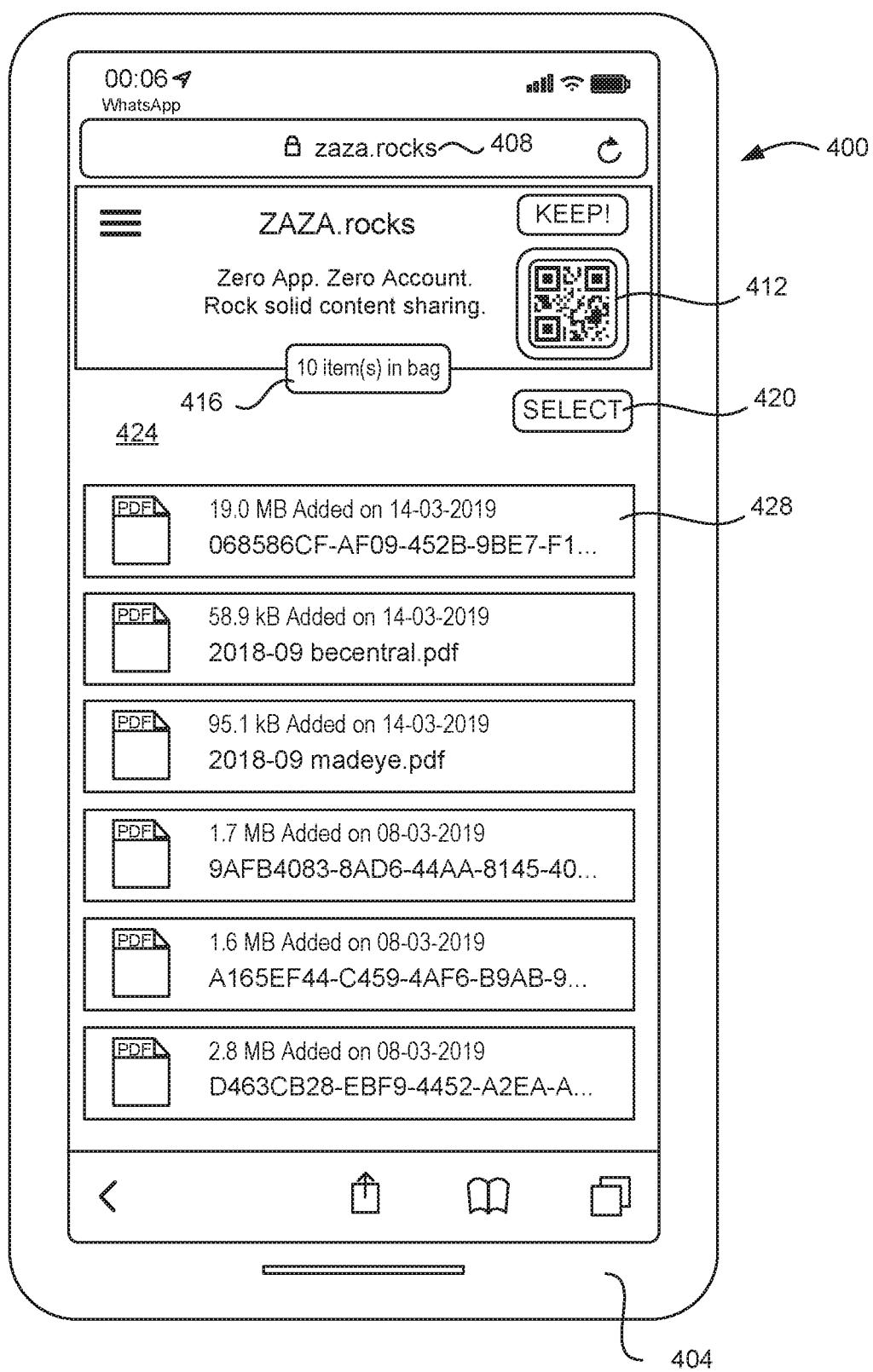
FIG. 7 illustrates a download page on the user mobile telephone.

FIG. 7 illustrates a download page 400 on the user mobile telephone. Shown is screen 404, the system Web site 408, an icon 412 used for downloading digital objects from other user devices using a QR code which will be described in greater detail below. Also shown is the number of digital objects in the owner bag 416, and a select button 420 used for showing checkboxes that allow individual selection of files for further operations. Region 424 displays the names of the objects in the bag, and these objects are shown at 428, for example.

Figure 8:
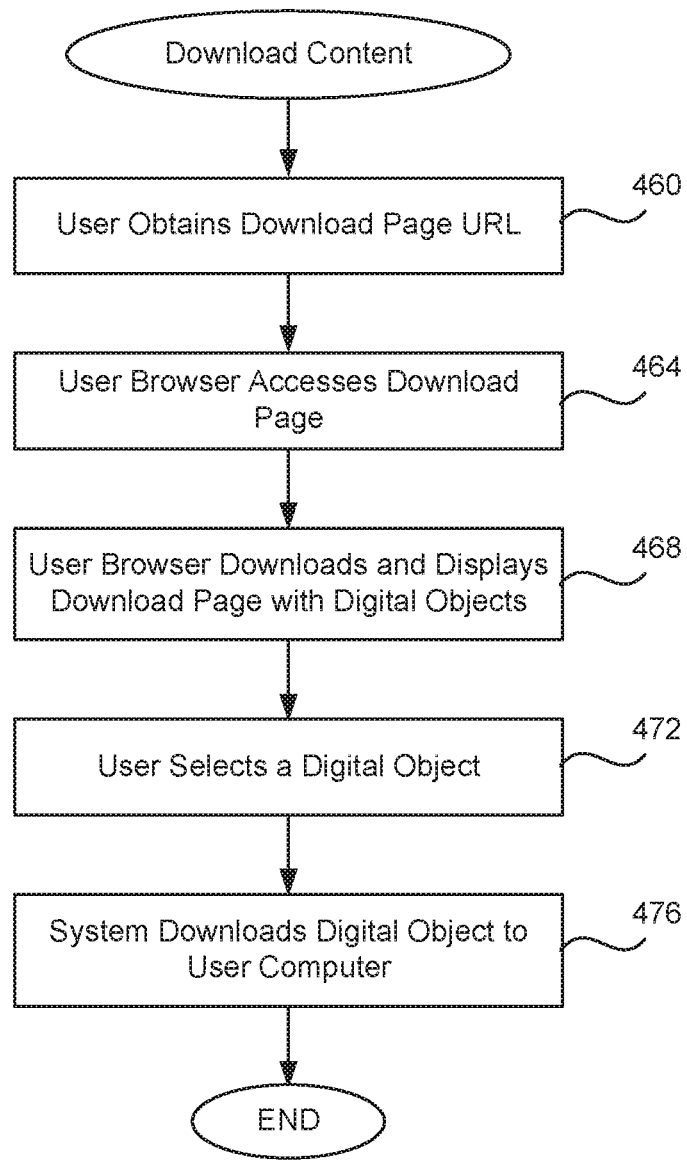
FIG. 8 is a flow diagram describing one embodiment by which any user may download content from a content bag created by the owner.

FIG. 8 is a flow diagram describing one embodiment by which any user may download content from a content bag created by the owner. Advantageously, any user with a computing device may download digital objects from an owner's content bag having only a standard browser on their computing device and either the download page URL or the owner page URL.

In a first step 460 any user with a computing device obtains the URL for the download page or for the owner page as downloading may occur using either page. The below description and FIG. 7 assume that the user is using the download page URL; a description of use of the owner page URL follows later. The download page URL may be obtained in different manners, for example, FIG. 2 shows how the download page URL is accessed from the owner page 200 by clicking icon 218. FIG. 4 shows how the upload and download URLs (312 and 316) may be distributed using any suitable messaging service, e-mail, social media posting, etc. Or, the download page URL may be obtained by clicking icon 219 or by using a six-digit code (both explained in greater detail below). FIG. 12 shows other methods as explained above.

In a next step 464 the user opens a standard Internet browser on his or her computing device, provides the download page URL or the owner page URL, and accesses that page using the browser. If the user is clicking a link 316 or an icon 218 it is possible that the browser will open automatically and load that page. Or, the user may cut and paste link 316 into a browser in order to access the page. Or, use of a QR code or six-digit code (as explained below) will allow a browser to access the download page. In the example of FIGS. 4 and 7, when the user selects link 316 the standard browser on his or her mobile telephone will automatically open and will load the page as shown in FIG. 7.

Next, in step 468 the browser downloads and displays the download page 400 as shown in FIG. 7. As shown, region 424 of the download page shows representations of all of the digital objects stored within the owner bag that is associated with the download page. For example, 428 displays an icon representing the type of digital object, its size, when it was added and its name, typically a human-readable name given to the object on the computing device from which it was uploaded. At this point, the digital object itself has not yet been downloaded from object storage 130 to the user's device. One technique for presenting the list of names in region 424 is illustrated in FIG. 1B. Preferably, the icon show the file name. When the user selects a file to be downloaded, what is transmitted to the plugin function is the file identifier and the bag identifier.

The system uses the download identifier 164 provided by the user as part of the download page URL as an index into table 160 to find download identifier 174. Identifier 174 corresponds to the bag 1 identifier 180, which is used as an index into table 162. This table has three rows that include that particular bag identifier in the first column, thus identifying three digital objects 181-183 that are present within that content bag. Next, the bag identifier, the file identifier (e.g., 186) and name (e.g. 181) for each of these digital objects are downloaded to the client device for display within region 424. Although not shown, table 162 may contain other details on each digital object such as size, when it was added, type of file, etc. These digital objects and their names are then displayed in region 424 as shown in FIG. 7.

Next, in step 472 a user may select one or more of the digital objects for downloading. The user may select a digital object by touching it on the screen (for those devices with touch screens), by selecting it using the select button 420 (which brings up a checkbox field for each object), by using a mouse click, or by using any other suitable mechanism for selecting an item that is supported by the device operating system.

Once selected, in step 476 the user device requests download of that particular object and the system downloads that object from object storage 130 to the user computing device. Such downloading may be performed in at least two different manners. In one technique, the user device accesses the plug-in function executing upon server computer 120 over connection 152 in order to send a request to object storage 130 via connection 156 for the file selected. The function sends the bag identifier 185 and the file identifier 186 for each digital object requested to be downloaded to a URL that identifies the object storage. The object storage then finds the corresponding digital object (e.g., 192) and downloads that to the user computing device. In a second technique, the download request bypasses server computer 120. The user device sends the bag identifier 185 and the file identifier 186 for each digital object requested to be downloaded via authenticated Internet connection 158 directly from the object storage 130. This will typically be sent in the form of a signed "https" request to a URL that identifies a computer where object storage 130 is implemented to assure the object storage that the request is legitimate. The user device then downloads the digital object or objects directly from object storage via connection 158.

Depending upon the operating system of the user device and any settings or preferences that the user has made within the browser, the downloaded digital object may then be displayed on the screen of the user device, saved into a "downloads" folder, presented as an option in the menu bar of the browser to be opened or displayed, etc., as is known to those of skill in the art. Typically, the downloaded digital object will be displayed on the screen of the user device (i.e., stored temporarily in a memory of the user device), and will only be stored permanently into persistent storage of user device when the user takes a discrete action to store that digital object.

Exchange of Upload Page or Download Page

Above, steps 360 and 460 suggest different ways of sharing upload page or download page URLs so that other users may access these pages. Other techniques also may be used. For instance, suppose a first user wishes to share pages between two devices, potentially dissimilar, e.g., mobile or desktop. All the second device needs to access those pages is a camera, an Internet connection and a browser, or, nothing else than an Internet connection and a browser. No application need be downloaded nor installed on the first or second user device. Any camera, scanning or video functionality is inherent in most all operating systems and the user does not need to install any application in order to use them. The below description describes how pages on a first device may be shared with a second device.

Figure 10:
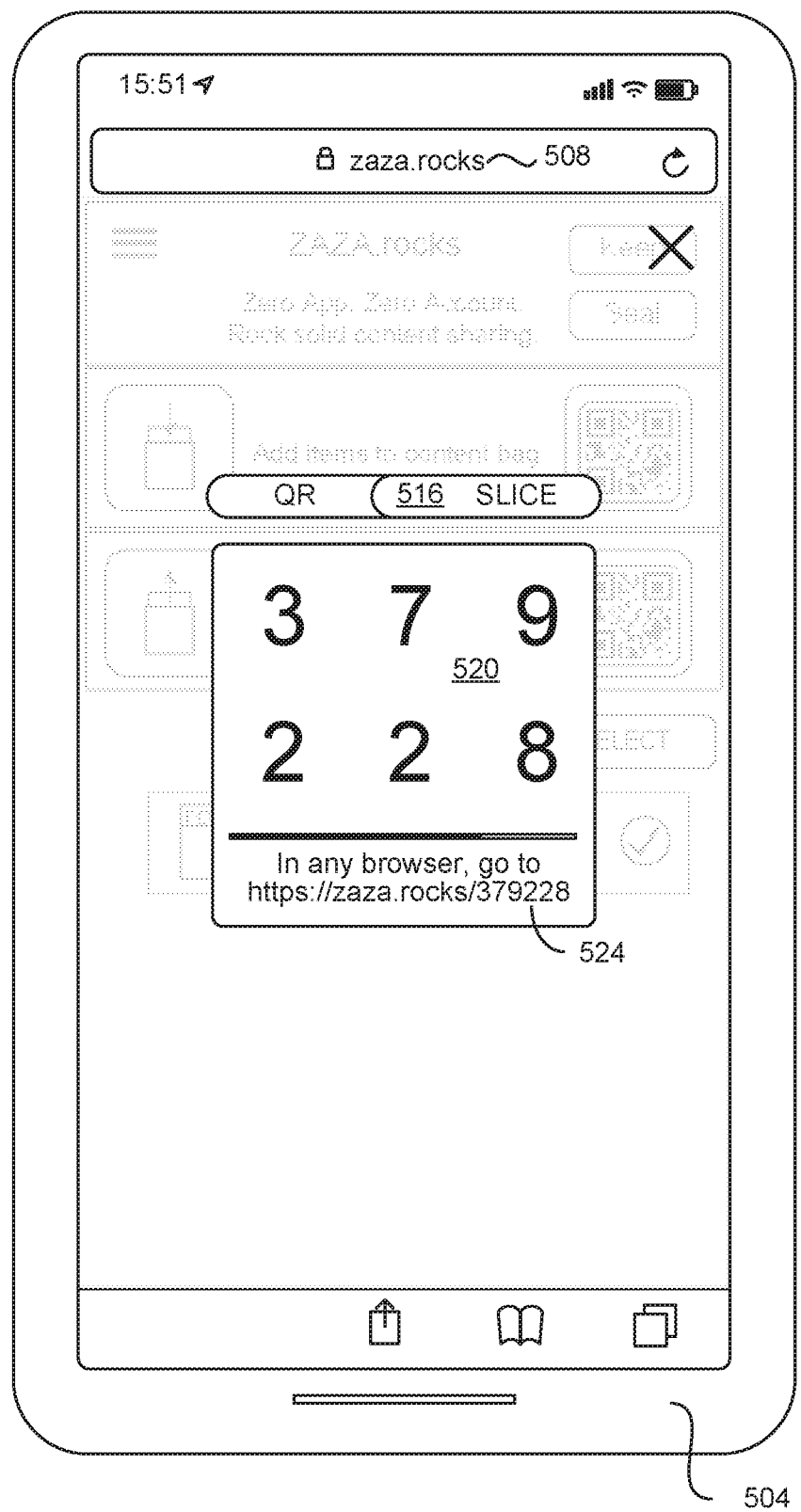
FIG. 10 shows the screen of the first computing device having a touchscreen toggle switch, a code and a URL.

FIG. 9 shows a screen of a first computing device having a touchscreen toggle switch 516 and a QR code 512. FIG. 10 shows the screen 504 of the first computing device having a touchscreen toggle switch 516, a code 520 and a URL 524. These figures will be discussed below.

When a user of a first computing device wishes to share an upload page or a download page with a second computing device (being operated by the user or perhaps by a second user), he or she may make use of QR code functionality. For example, when the first computing device shows owner page 200, upload page 320 or download page 400, that page also includes a button displaying a QR code icon. By way of example, owner page 200 displays buttons 215 and 219 (corresponding to the upload and download pages, respectively), upload page 320 displays a button 336 and download page 400 displays a button 412. Note that buttons 215, 219, 336, 412 look like a QR code, but they may appear in any form and do not have to display a facsimile of a QR code. By pressing that button, a corresponding relatively large QR code 512 will be created by the system on the server computer (which embeds either the upload page URL or the download page URL), and that QR code is then displayed upon the screen of the first computing device. Depending upon whether the button pressed corresponds to the upload page or to the download page, QR code 512 represents a link to the upload page or to the download page. FIGS. 9 and 10 show the result after a button 215 or 219 was pressed on the owner page 200, but, the buttons on pages 320 and 400 may also be used. Various implementations are possible. By way of example, when the QR code button is pressed, the image of the larger QR code may be generated on the server computer and then downloaded to the user device, the larger QR code may already be embedded in the download page, or, the larger QR code may be generated on-the-fly on the user device.

A user of the second computing device then scans that QR code using a camera of their device, and, using known QR code technology, a browser on that second device will then open the corresponding upload page or download page. (Some operating systems will query the user first if an Internet browser on that second device should be opened to access that page.) Thus, the second computing device will then display upload page 320 or download page 400 as the case may be. Accordingly, FIG. 9 shows an alternative technique for performing either steps 360-368 or steps 460-468 for displaying an upload page or a download page on a second computing device. FIG. 1A shows a second device 111 with a connection 159 to the server computer.

Now, consider that the first user wishes to share access to the content bag with a computing device that does not have a QR code scanning camera or function, such as a laptop computer. In that case, we use another innovative mechanism. Note that screen 504 with the QR code 512 has a toggle switch 516. This toggle switch is currently slid to the left, selecting "QR." The right portion of the switch says "SLICE," which stands for Short-Lived ID Code Exchange. When the first user toggles the switch to SLICE, the system on the server computer receives that signal and generates a six-digit code that, when used in a URL, links to the upload page or to the download page, as the case may be. The system then sends that code 520 to the first device and the screen in FIG. 10 will appear on the first device and the six-digit code 520 will be shown that provides access to the upload page or to the download page. Below, the actual URL 524 that the user should type into a browser on the second device is shown. Thus, while the six-digit code is valid, a user can use any browser on the second device and type "zaza.rocks/379228" in the address field to open the exact same upload or download page shown on the first device. Accordingly, FIG. 10 shows an alternative technique for performing either steps 360-368 or steps 460-468 for displaying an upload page or a download page on a second computing device. Preferably, the plugin function maps the six-digit code to the upload or download page using a mapping table that remains valid for 20 seconds, for example, or for another predetermined time. When the QR code button is pressed, the SLICE code is preferably generated on the server computer and then downloaded to the user device.

In one particular embodiment, this code is valid only for a predetermined, limited time, e.g., 60 seconds, 20 seconds, etc. Once the time period is up, the code may not be used to access the corresponding upload or download page. Depending upon the particular design implementation, when the plug-in function on server computer 120 provides code 520, it will begin a countdown for that limited time. Once the limited time is up, the plug-in function will not accept that code as access to the upload or to the download page any more. In another embodiment, code 520 appears on the screen once button 215, 219, 336 or 412 is pressed, and one may toggle 516 to show the SLICE code. And, code 520 may be any alphanumeric code capable of being entered on a keyboard.

The fact that this SLICE link is short—only six characters—creates interesting new possibilities. Just imagine that you need to discuss a presentation over the telephone: "zaza.rocks/379228" is quickly dictated over the telephone so that a user on the second computing device can access the presentation and content bag as quickly as possible without needing to download any application and without needing any account.

Upload Via E-Mail Attachment

An additional upload embodiment involves uploading an e-mail message attachment to a bag. Every bag has a virtual e-mail address as follows: [optional free text label].[bag identifier] @zaza.rocks. For example, one e-mail address for a particular bag may be: "invoices.0aef310d388ed91ca044e6b7c01a723d@zaza.rocks." The word "invoices" here is an optional text label that does not carry any semantics; it will help to recognize an e-mail address in an address book. When the message carries one or more attachments, those will be stored in the pertaining bag upon receipt of the e-mail message as described below.

Figure 11:
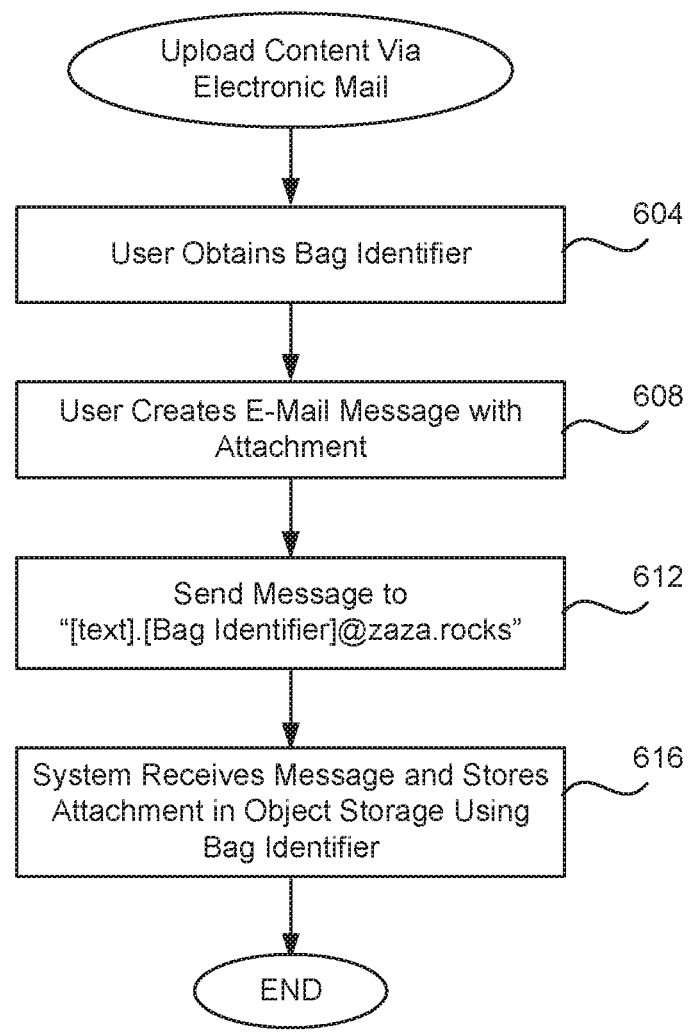
FIG. 11 is a flow diagram describing how content may be uploaded to a content bag via electronic mail.

FIG. 11 is a flow diagram describing how content may be uploaded to a content bag via electronic mail. In a first step 604 a user operating a computing device obtains a bag identifier (e.g., a 32-character hexadecimal string) such as has been described above in steps 360, 460, etc. For example, that bag identifier may be distributed via a message (such as shown in FIG. 4), may be copied from the URL of the owner page and then distributed, etc. It is understood that an owner page has already been created and a database structure has been set up as has been described in FIG. 3. Next, using his or her computing device, the user creates any suitable e-mail message and attaches one more attachments. Each attachment may be any suitable digital object as has been described above such as a document, file, photograph, video, etc. In alternative embodiments, the digital object may be included in the body of the e-mail message, included within the subject, or may be otherwise included as part of e-mail message and not necessarily as an attachment.

In step 612 the user addresses the mail message to "[text].[bag identifier]@zaza.rocks." The field [text] is optional and may be left blank, or may be filled in using any simple text that helps identify the nature of the e-mail address. By way of example, as shown above, the word "invoices" may be used to indicate that the attachment is a particular invoice. The field [bag identifier] is a unique bag identifier created in step 264 and in this embodiment is a 32-character hexadecimal string. The domain "zaza.rocks" is any suitable domain used by the system and will direct the e-mail message to an e-mail server on server computer 120 that is under control of the plug-in function previously described. The user then sends this e-mail message with the attachment to this address.

In step 616 an e-mail server of server computer 120 receives the e-mail message and directs it to the plug-in function. Alternatively, the plug-in function can poll the e-mail server periodically to read any e-mail messages that have arrived. Preferably, the plug-in function retrieves the e-mail message using standard e-mail protocols and software on computing device 120.

Once in possession of the e-mail message, the plug-in function strips out the bag identifier and uses it to create a new row in table 162 to hold metadata for the received attachment. The plug-in function creates a file identifier for the attachment, obtains the name of the attachment from the message, and then stores this identifier and name in the second and third columns of the new row just created. These steps may be performed as has been described in step 376. Finally, the plug-in function stores the attachment in object storage 130 using the bag identifier and the file identifier as an index into that storage such as a shown, for example, in row 192. Of course, step 616 may be performed for any number of attachments that are attached to the e-mail message.

Thus, a digital object has been uploaded to object storage and placed into a particular content bag using electronic mail and is now available to be viewed, downloaded, etc. And, no additional application (other than an e-mail program which comes standard on many computing devices) is needed to perform this uploading. In fact, any computing device that uses Web mail on an Internet browser does not need any e-mail program.

Security for Owner, Upload and Download Pages

Above are described embodiments that do not require installation of applications, user names, user-selected passwords, and user accounts; this is the standard case for non-sensitive content. In situations where content is sensitive, independent passwords can be placed on each of the owner, upload and download pages by the owner. Those passwords will then need to be communicated out of band to the target audience of those pages. Note that a user of any of these pages (when provided with the appropriate identifier or URL) still does not need to download and install an application, establish an account, register himself or herself, provide personal information such as a user name or password personal to that user. The password that the owner establishes for a given page is associated with that page only; it is not a personal password of any user. In fact, when an owner establishes a password for a given page, the owner must communicate that password in some fashion to a future user; the future user does not generate the password himself or herself.

FIG. 12 illustrates a settings screen 700 accessible from the owner page 200. As mentioned earlier, an owner creates a new owner page via the steps of FIG. 3 and is presented with an owner page such as shown in FIG. 2. Should the owner then desire to place a password on one of the three pages, he or she clicks menu link 230 and is then presented with screen 700. Toggle buttons 704 and 708 allow the owner to allow or prevent users from downloading files or from uploading files. Assuming that users are allowed to download files and upload files (which is the state of buttons 704 and 708 on screen 700), then screen 700 also displays password fields 712, 716 and 720. If any of these fields are left blank by the owner then there will be no password required for that particular page and the user is free to access each of these pages without entering a password. If, however, the owner wishes to password protect one of these pages he or she enters a password in the appropriate field. For example, should the owner wish the download page to be protected by a password (i.e., any user in possession of the download URL will not be able to view that page unless the corresponding password is entered), then the owner enters a password in field 712. Different passwords may also be entered in fields 716 and 720; of course, each password may be the same, but it is preferable that each is different.

Next, assuming that a password has been entered for at least one of the pages, the password will be sent to the plug-in function on the server computer once the tab key or return key is pressed or once the screen is closed. The plug-in function then receives this password (or passwords) and inserts it into view table 160 as follows. As shown in FIG. 1B, the second column 116 of the view table 160 has space for the password corresponding to a particular content bag of the same row. By way of example, should a password be provided in field 716 for the upload page, then that password will be inserted in row 172 and in column 116 (corresponding to the content bag identified by bag 1 identifier). As shown, bag 2 (and any other content bags) also have a password field associated with each of their owner, upload and download identifiers. Of course, if an owner does not supply a password in any of fields 712-720, then the corresponding field in column 116 will be left blank and no password will be required to access that page.

Once the owner has entered a password for one or more pages, the owner will communicate this password or passwords to any number of users in any suitable fashion such as verbally, by paper, mail, e-mail, text message, etc. As explained below, when a user requests to access a certain page that is password protected and then enters a password, column 116 will be used to determine if a password is required, and if so, if the user has supplied the correct password.

Figure 13:
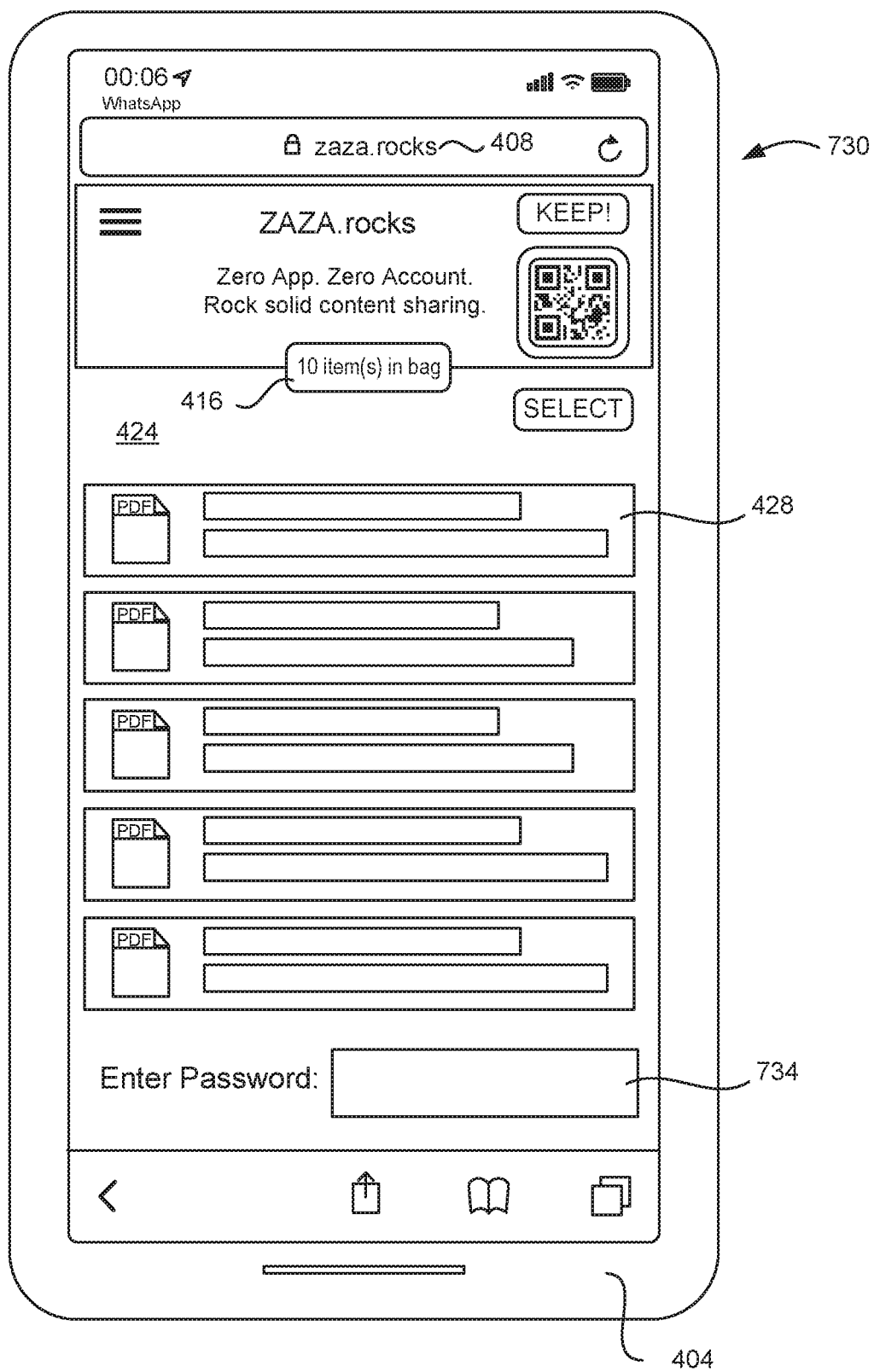
FIG. 13 shows a download page protected by a password.

FIG. 13 shows a download page 730 protected by a password. Shown is page 730 having region 424 listing all files in the content bag, but, as shown at 428 and below, the name and data of each file is in gray and cannot be read nor viewed or downloaded by a user. Shown also is a password field 734 into which a user may enter password in order to access the download page.

Figure 14:
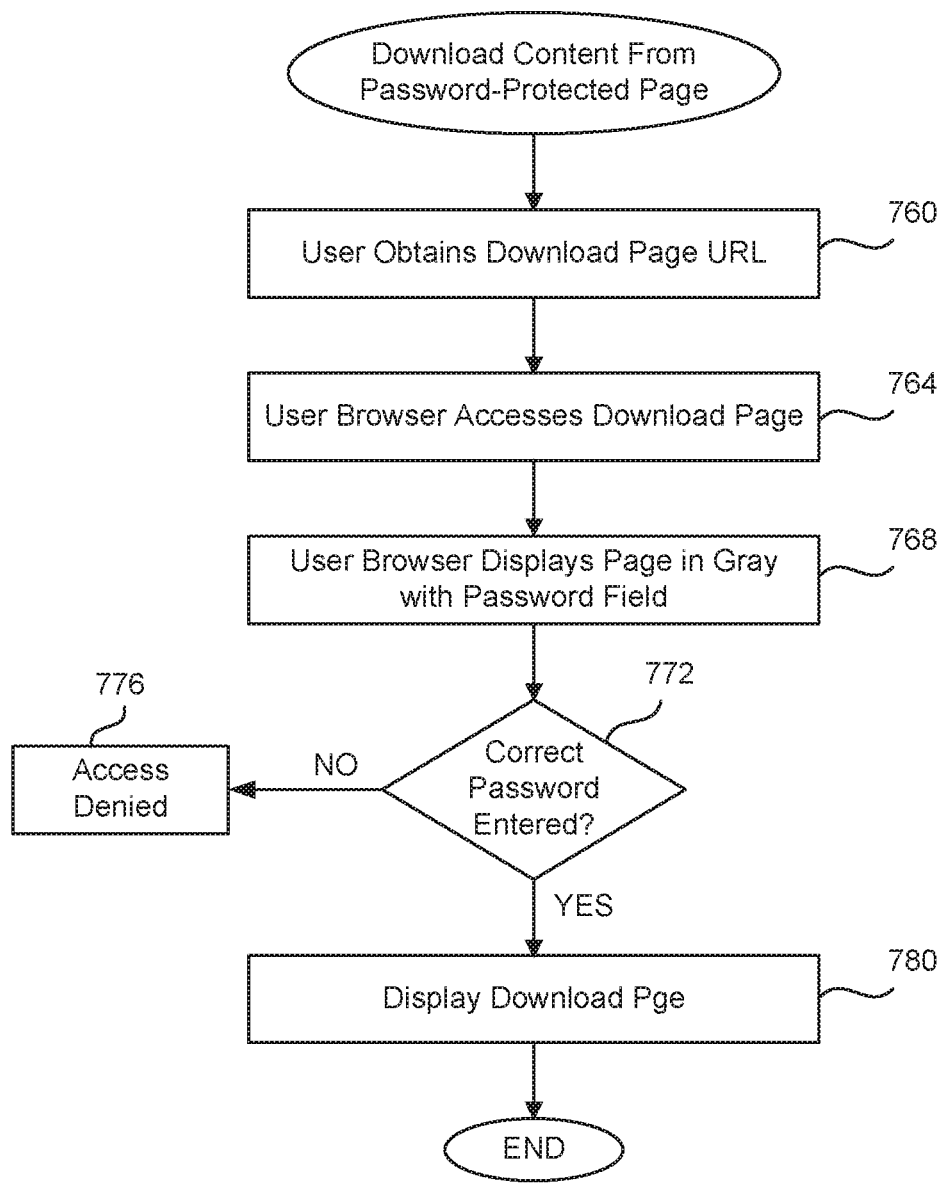
FIG. 14 is a flow diagram describing one embodiment by which the user gains access to a password-protected download page.

FIG. 14 is a flow diagram describing one embodiment by which the user gains access to a password-protected download page. In step 760 any user obtains a download page URL for a particular content bag which may be performed as previously discussed in step 460. In step 764 the browser of the user device accesses the download page as has previously been discussed in step 464. Additionally, the plug-in function, when accessing view table 160 in order to determine from which content bag to download files, will determine whether or not a password is present in column 116 for the appropriate download identifier. For example, assuming that download identifier 164 matches download identifier 174, the plug-in function will determine if a password exists in the corresponding field of column 116. If so, then step 768 will be performed as described below, if not, the page will download as previously discussed in FIG. 8.

Step 768 is performed in a similar fashion as in previous step 468 except that the download page will appear as shown in FIG. 13. The user will not be able to view, download or read data concerning any of the files. The particular technique used to gray out the names of the files, make the files inaccessible, etc. may be performed in different manners. The file names and other data may actually be visible, but the user will not be permitted to download a file until the correct password is provided. There will also be a password field 734.

In step 772 the user enters a password in field 734 and enters the tab key or return key. This information is transmitted to the plug-in function which then accesses view table 160 and checks if the entered password matches the download password in column 116 corresponding to download identifier 174. If not, then access to the download page is denied and the user will still not be able to download any of the files in the content bag. If there is a match, then in step 780 the plug-in function will proceed to display the download page as previously discussed in step 468 and control may continue as further described in FIG. 8.

Although use of password protection on only a download page is described, one of skill in the art will be able to use this disclosure to add a password field to an upload page or to an owner page, will be able to present a similarly modified page as shown in FIG. 13, and will understand how to modify FIG. 14 to apply to an upload page or to an owner page. In those other scenarios the plug-in function will make use of the owner password or the upload password in column 116.

Digitally Sealing a Content Bag

A content bag and its digital objects can be sealed, i.e., made read only, with its comprehensive hash value sealed using blockchain technology. This embodiment also is equipped with functionality for verification at any time of the integrity of the contents of the bag, its sealing date and time, and optionally authentication/ownership through digital signatures. A corresponding physical QR code for the sealed content bag is ideally suited to stick on binders and agreements.

Figure 15:
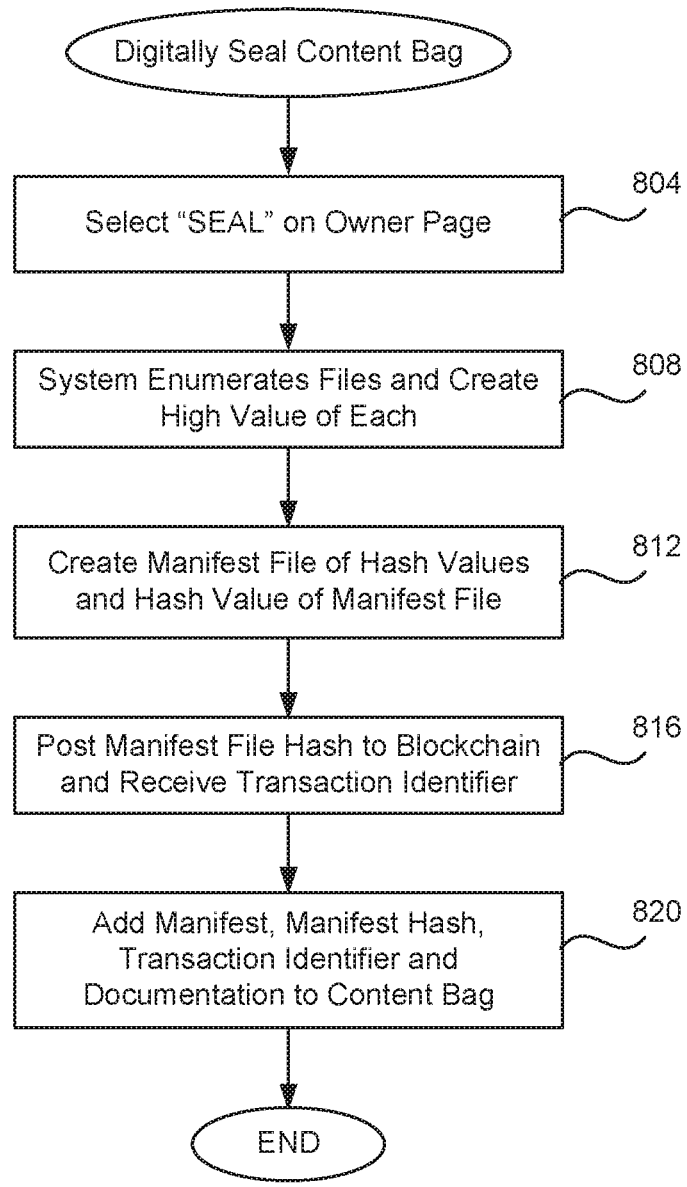
FIG. 15 is a flow diagram describing one embodiment by which the contents of a content bag are digitally sealed.

FIG. 15 is a flow diagram describing one embodiment by which the contents of a content bag are digitally sealed. This embodiment is useful in a variety of situations where any number of files, documents (or other digital objects) must be associated together, and at a later date, it must be proven that these documents existed together in their original form at a certain point in time. For the purposes of this flow, it is assumed that an owner (and any number of users) have created a content bag and owner page as described in FIG. 3, and have uploaded any number of digital objects as described in FIG. 6 or 11.

In a first step 804 the owner (or other user) selects the "SEAL" button 240 on the owner page as shown in FIG. 2 in order to begin the process and as a signal to the plug-in function on the server computer to begin performing the following steps. Pressing this button sends the owner identifier to the plug-in function to begin the process.

In step 808 the plug-in function enumerates all of the files in the content bag corresponding to the owner identifier, for example by utilizing tables 160 and 162 as has been described above. The plug-in function is thus able to retrieve all digital objects corresponding to that content bag and will create a hash value for each of those digital objects. Any suitable hash function may be used to create the hash value, and suitable hash functions are SHA-256 or higher, or any similar or future one-way hash function that is considered secure at the time of application.

Next, in step 812 a manifest file is created that contains all of these hash values along with the corresponding name of each file, e.g., each row of the manifest file may contain an entry such as "File Name 1; Hash (file 1)", such that each hash value is associated with its corresponding file name. A hash value will then be calculated for this manifest file, the "manifest file hash." In step 816 this manifest file hash will be posted to a suitable block chain technology and in return that block chain technology will return to the plug-in function a transaction identifier. Use of block chain technology to post information and to receive transaction identifiers is known in the art.

FIG. 16 illustrates a block chain notarization page that may be produced after step 816. Shown is a link to a particular file "sealinfo.html" 840 that is a link to the manifest file holding all the file names and their respective hash values from the original content bag. Hash value 844 represents the manifest file hash.

Shown also is the time and date when this transaction took place. Transaction ID 852 is the transaction identifier returned from the blockchain technology. The transaction identifier serves as a link to the proof in the blockchain of the manifest file hash, its integrity and when it was posted; it is immutable. In this particular example, the blockchain Ethereum is being used, although any other suitable block chain technology may also be used. Link "Verify" 856 may be used to verify the contents of the bag at a later point in time using any suitable public service as will be explained below.

Next, in step 820 any of a variety of documents and values may be placed into the content bag to allow any person in the future to independently verify that the digital objects represented by the manifest file did exist together at a particular point in time and have not been changed. For example, placed into the content bag are the manifest file itself, the manifest hash value, the transaction identifier and documentation such as steps that can be taken to independently verify the integrity of the manifest file and its contents. The hash value, transaction identifier and documentation are typically placed into a file in order to upload them into the content bag. For example, assuming that FIG. 7 represents the content bag after being modified by step 820, two files represent the original contents of content bag, while the other four files represent the manifest file, the manifest hash value, the transaction identifier in the documentation. In one specific embodiment, all that is needed in the content bag for later verification of the original contents of the content bag is: the original contents of the content bag (the files enumerated in step 808), and the transaction identifier. Any future user wishing to verify the original contents will be able to recalculate the manifest file and the manifest hash value; the documentation may be communicated to any user in other manners. The documentation may include steps to independently verify the integrity of the manifest file and its contents, such as using publicly-available services such as Etherscan described below.

Once step 820 has been completed by the plug-in function the content bag along with its original contents from step 804 now contains additional information allowing any person to independently verify those original contents.

Figure 17:
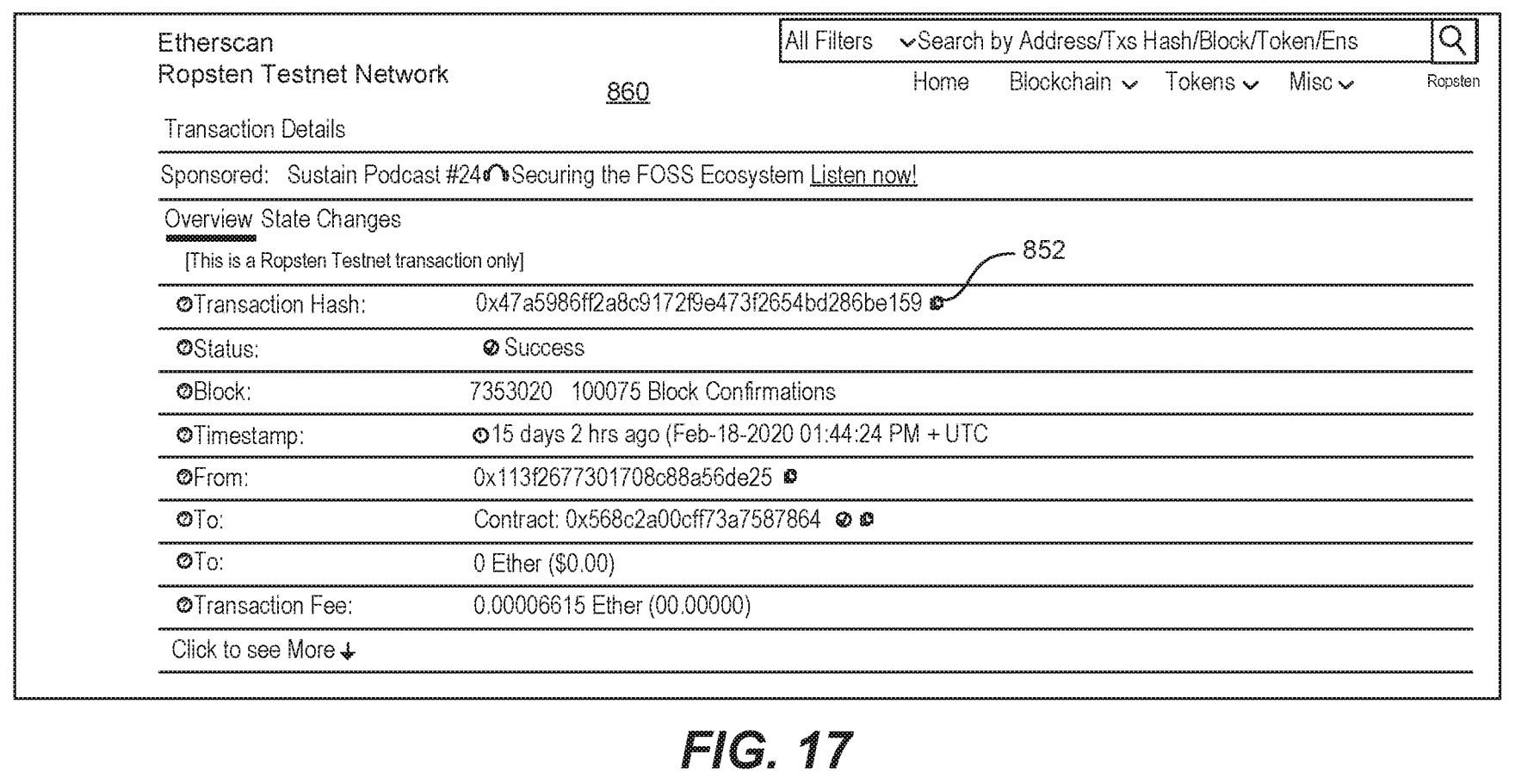

FIG. 17 is a page 860 from "Etherscan" which is a publicly available service allowing any individual to determine what a transaction identifier from the Ethereum block chain represents. For example, link 856 of FIG. 16 provides a link to the page 860. Alternatively, one may access Etherscan independently and provide the transaction identifier 852 in the field as shown. Once provided, the individual may then use the transaction identifier in the Etherscan service to obtain the original manifest file hash that was posted to the blockchain back in step 816. The nature of blockchain technology guarantees that this manifest file hash was created on a certain date and uniquely identifies one or more digital objects.

Next, the individual accesses the content bag (using the owner page or download page) and downloads all files which were originally in the bag and from which hash values were originally calculated in step 808. The individual recalculates hash values for these files, puts them into a manifest file as was done in step 812, recalculates a new hash value for that manually created manifest file. If this new hash value matches the manifest file hash value obtained from the block chain technology using the transaction identifier, this guarantees that the original files in the content bag did exist together at a particular point in time indicated by the transaction identifier.

Computer System Embodiment

Figure 18A:
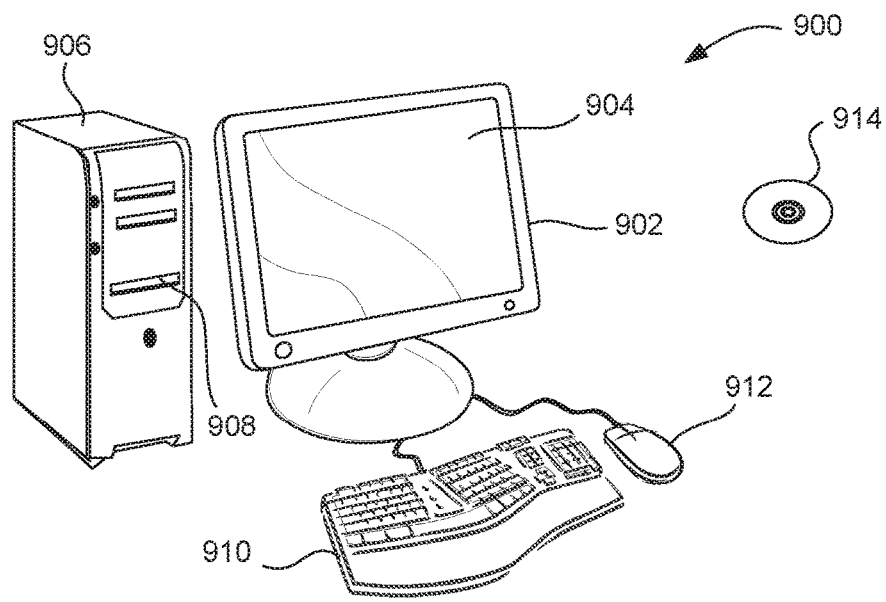
FIGS. 18A and 18B illustrate a computer system suitable for implementing embodiments of the present invention.
Figure 18B:
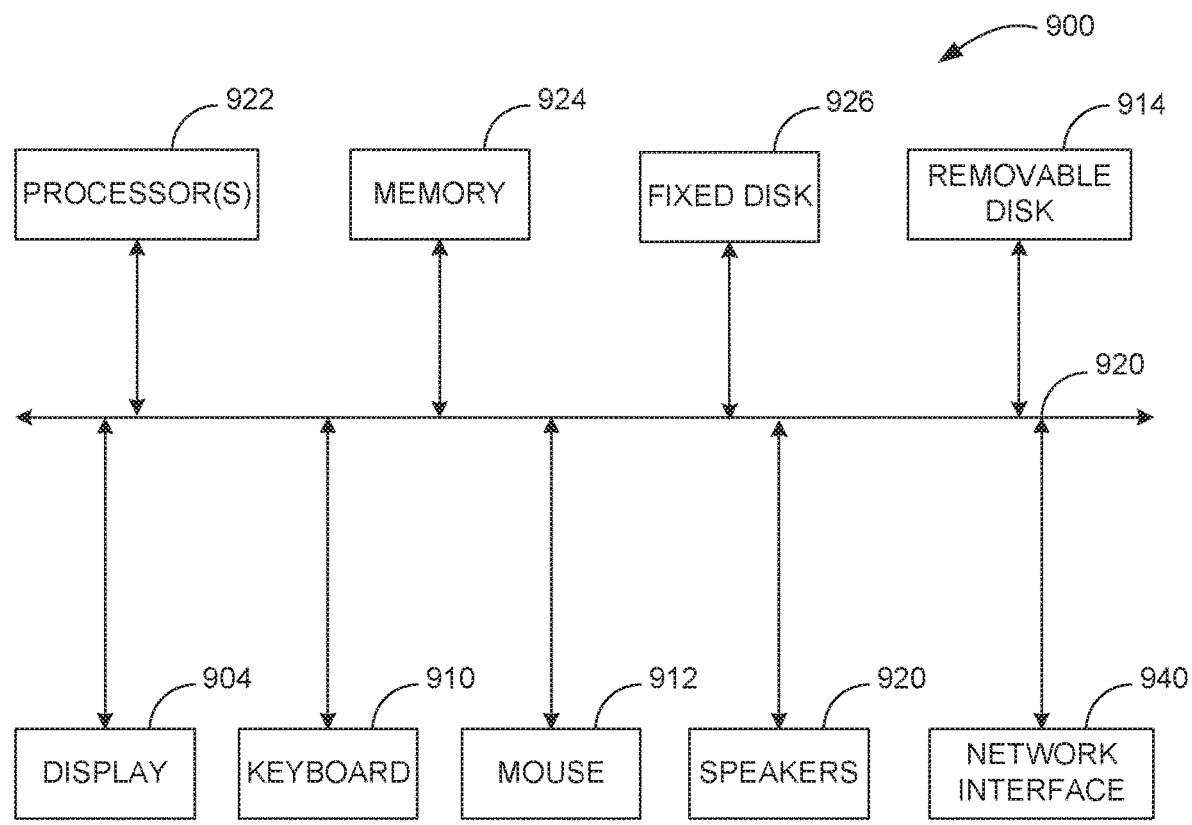

FIGS. 18A and 18B illustrate a computer system 900 suitable for implementing embodiments of the present invention. FIG. 18A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 18B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of downloading a download Web page using a quick response (QR) code in order to share content from a first user computing device to a second user computing device, said method comprising:
    receiving at a server computer over an Internet connection a request from a first user computing device for a download Web page, said download Web page identified by a download page uniform resource locator (URL) that includes a unique download identifier, wherein said unique download identifier is associated in a one-to-one relationship with a unique bag identifier in a database of said server computer;
    downloading said download Web page to a browser of said first user computing device, said download Web page including an icon representing a QR code and at least one icon representing a digital object accessed via said unique bag identifier;
    displaying a QR code embedding said download page URL on said browser of said first user computing device when said icon is selected by a user;
    receiving at said server computer from a second user computing device a request for said download Web page that includes said download page URL obtained by said second user computing device by scanning said QR code displayed on said first user computing device; and
    downloading said download Web page to a browser of said second user computing device including said at least one icon representing said digital object.

2. A method as recited in claim 1 wherein said server computer does not receive any user account information from said first or second user computing device in order to download said download Web page.

3. A method as recited in claim 2 wherein said first or second user computing device does not require any application other than an Internet browser in order to download said download Web page.

4. A method as recited in claim 1 wherein said server computer does not receive any user-generated password or any personal data from a user of said first or second user computing device.

5. A method as recited in claim 1 further comprising:
    enumerating at least one digital object by using said unique bag identifier to enumerate files in object storage that use said unique bag identifier as an index, said digital object having a unique file identifier, wherein said download Web page including an icon representing said digital object.

6. A method as recited in claim 5 wherein said digital object in said digital storage is only accessible via said unique bag identifier.

7. A method as recited in claim 1 wherein said icon is a facsimile of a QR code but does not function as a QR code.

8. A method as recited in claim 1 wherein said download Web page displays said QR code by retrieving said QR code from within said download Web page or displays said QR code by downloading said QR code from said server computer when said icon is selected.

9. A method as recited in claim 1 wherein said icon is viewable on said second user computing device, wherein said digital object may be downloaded to said second user computing device, and wherein content may not be uploaded to storage locations accessed via said unique bag identifier by way of said download Web page.

10. A method as recited in claim 9 wherein an upload identifier of an upload Web page is also associated with said unique bag identifier, wherein content may be uploaded to said storage locations accessed via said unique bag identifier by way of said upload Web page.

* * * * *